United States Patent [19]

Sambayashi et al.

[11] Patent Number: 4,786,945
[45] Date of Patent: Nov. 22, 1988

[54] MICROFILM READER-PRINTER

[75] Inventors: Takeshi Sambayashi, Tokyo; Hideshi Oushiden, Kawasaki; Akihiko Kida, Ebina, all of Japan

[73] Assignee: Kabushiki Kaisha Toshiba, Kawasaki, Japan

[21] Appl. No.: 947,384

[22] Filed: Dec. 29, 1986

[30] Foreign Application Priority Data

Mar. 20, 1985 [JP] Japan .................. 61-63076
Dec. 27, 1985 [JP] Japan .................. 60-293204
Mar. 28, 1986 [JP] Japan .................. 61-70397

[51] Int. Cl.$^4$ .................. G03G 15/00; G03B 13/24; G03B 13/26
[52] U.S. Cl. .................. 355/14 R; 355/44
[58] Field of Search .................. 355/14 R, 14 CU, 50, 355/69, 40, 41, 44, 45; 340/713, 716; 307/96, 97

[56] References Cited

U.S. PATENT DOCUMENTS

| | | |
|---|---|---|
| 3,373,653 | 3/1968 | Roberts et al. .................. 355/14 R |
| 3,677,637 | 7/1972 | Van Auken et al. .................. 355/14 R |
| 4,324,485 | 4/1982 | Asakura et al. . |
| 4,341,463 | 7/1982 | Kashiwagi et al. . |
| 4,501,483 | 2/1985 | Romansky et al. .................. 355/3 FU |
| 4,502,483 | 2/1985 | Romansky et al. . |
| 4,505,575 | 3/1985 | Palumbo . |
| 4,568,173 | 2/1986 | Abuyama . |
| 4,600,293 | 7/1986 | Watanabe . |
| 4,618,245 | 10/1986 | Fukushi et al. . |
| 4,627,703 | 12/1986 | Suzuki et al. . |
| 4,627,710 | 12/1986 | Goetz .................. 355/14 R |
| 4,633,405 | 12/1986 | Ito et al. . |
| 4,634,260 | 1/1987 | Watanabe . |
| 4,673,282 | 6/1987 | Sogame . |

FOREIGN PATENT DOCUMENTS 56-117259 9/1981 Japan .

Primary Examiner—Arthur T. Grimley
Assistant Examiner—Ed Pipala
Attorney, Agent, or Firm—Cushman, Darby & Cushman

[57] ABSTRACT

There is disclosed a microfilm reader-printer which permits to be set a number of pages of printing which exceeds a maximum number of pages of continuous printings of the printer body. The printer body outputs a completion signal to a device which set the number of pages of printing when printing is completed. The device sends a print request signal to the printer body every time when it receives a complete signal, until completion of printing for the set number of pages. The printer body completes the printing operation once for each maximum continuous number of pages of printing, but resumes printing if a print request signal is outputted successively.

9 Claims, 23 Drawing Sheets

| S-AVAIL | F-AVAIL | CONTROL PANEL |
|---------|---------|----------------|
| OFF | OFF | READER-PRINTER |
| OFF | ON | READER-PRINTER |
| ON | OFF | PAGE SEARCHER |
| ON | ON | PAGE SEARCHER |

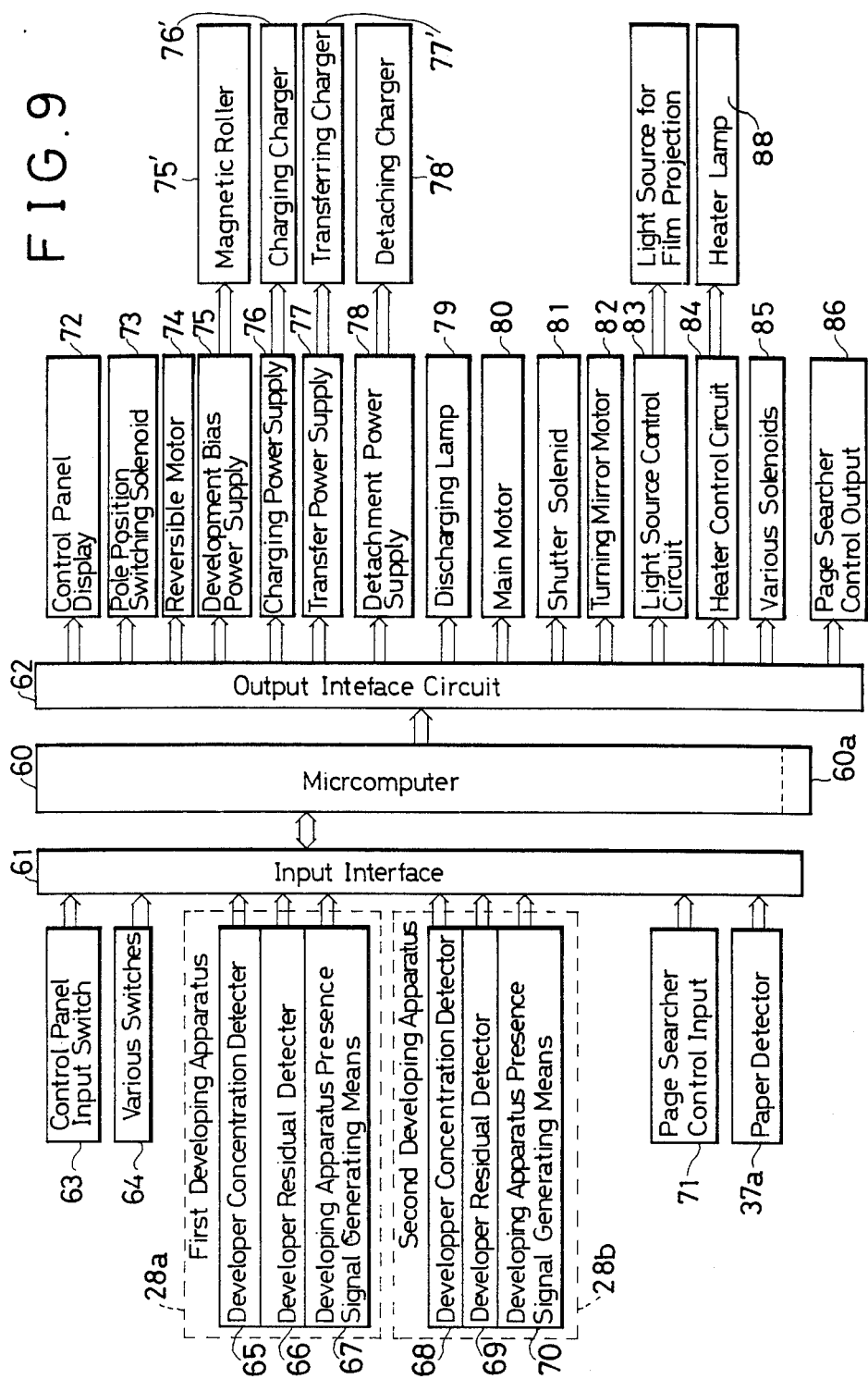

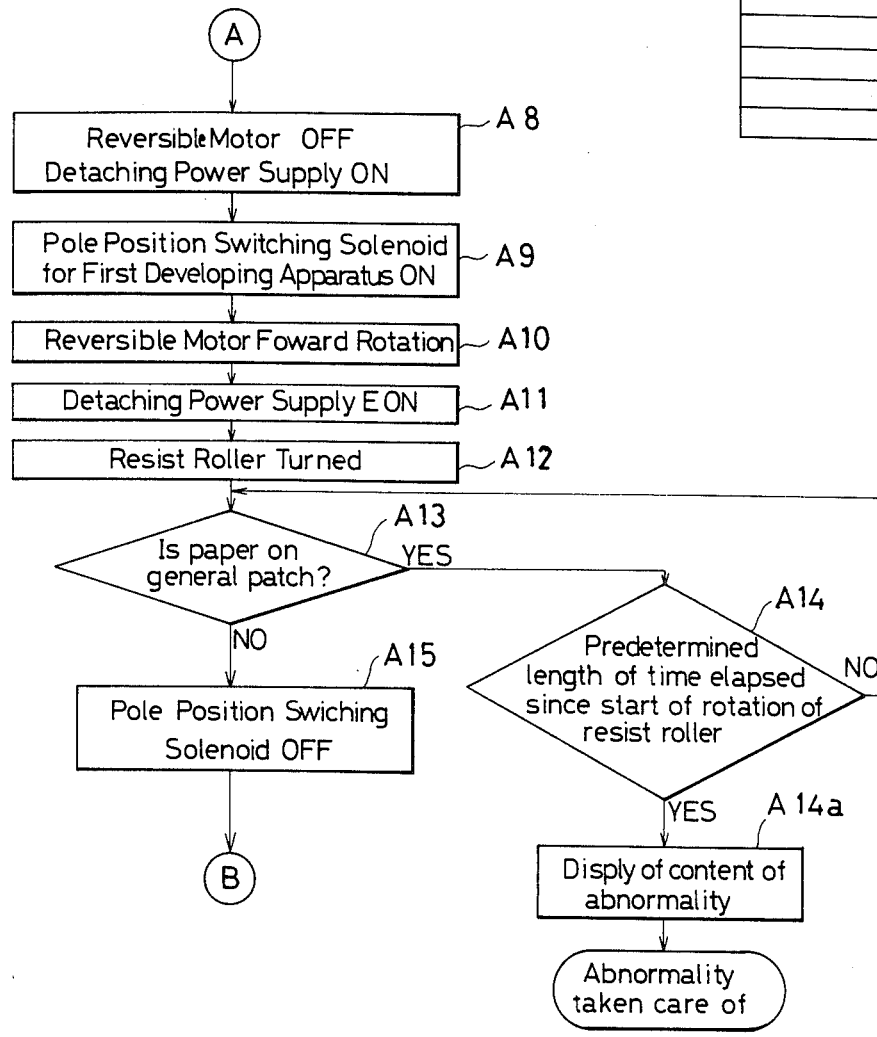

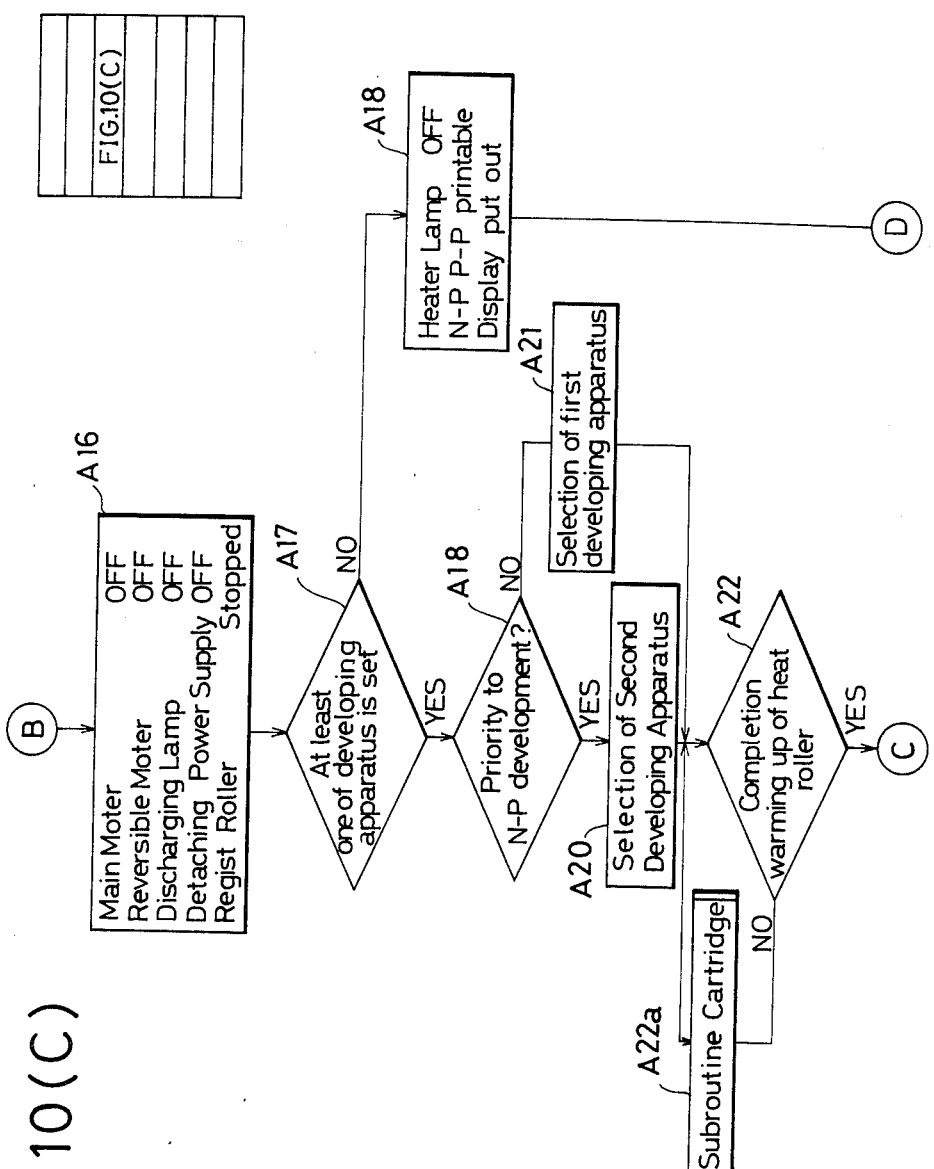

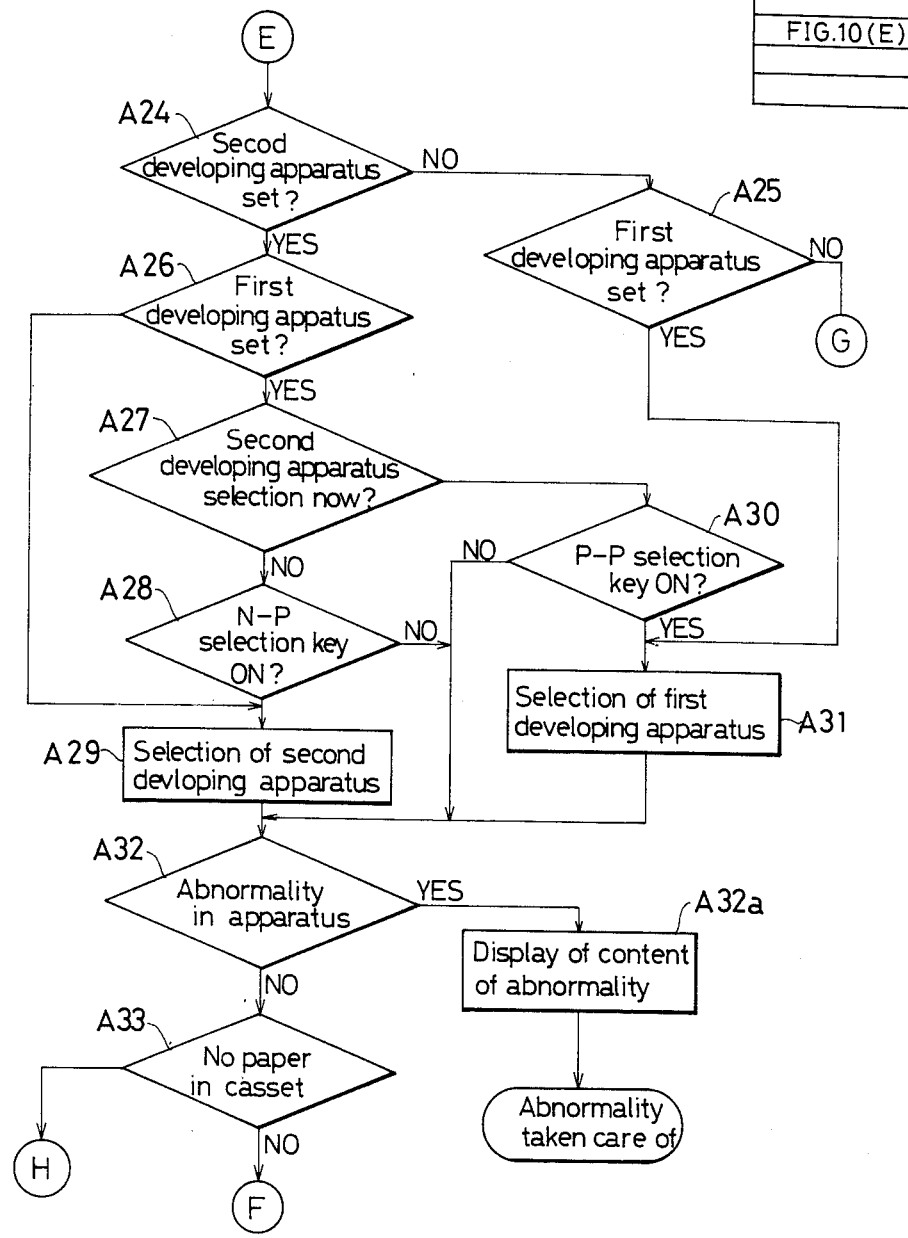

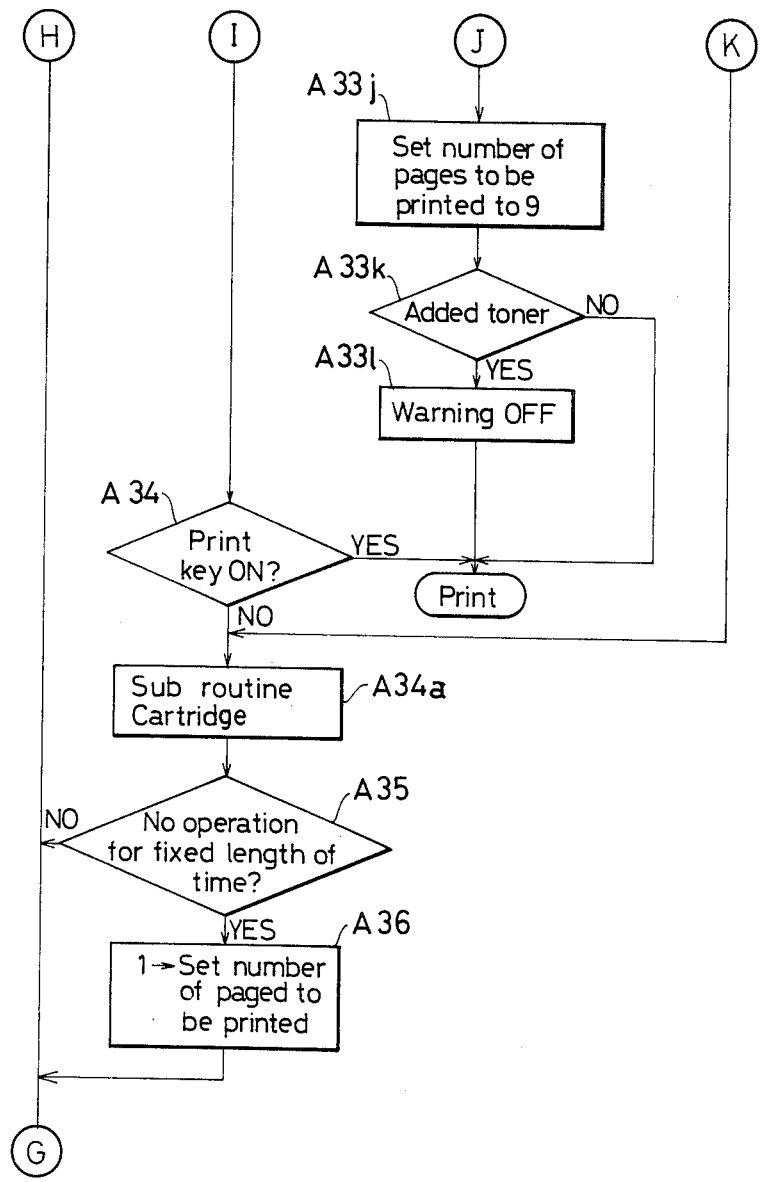

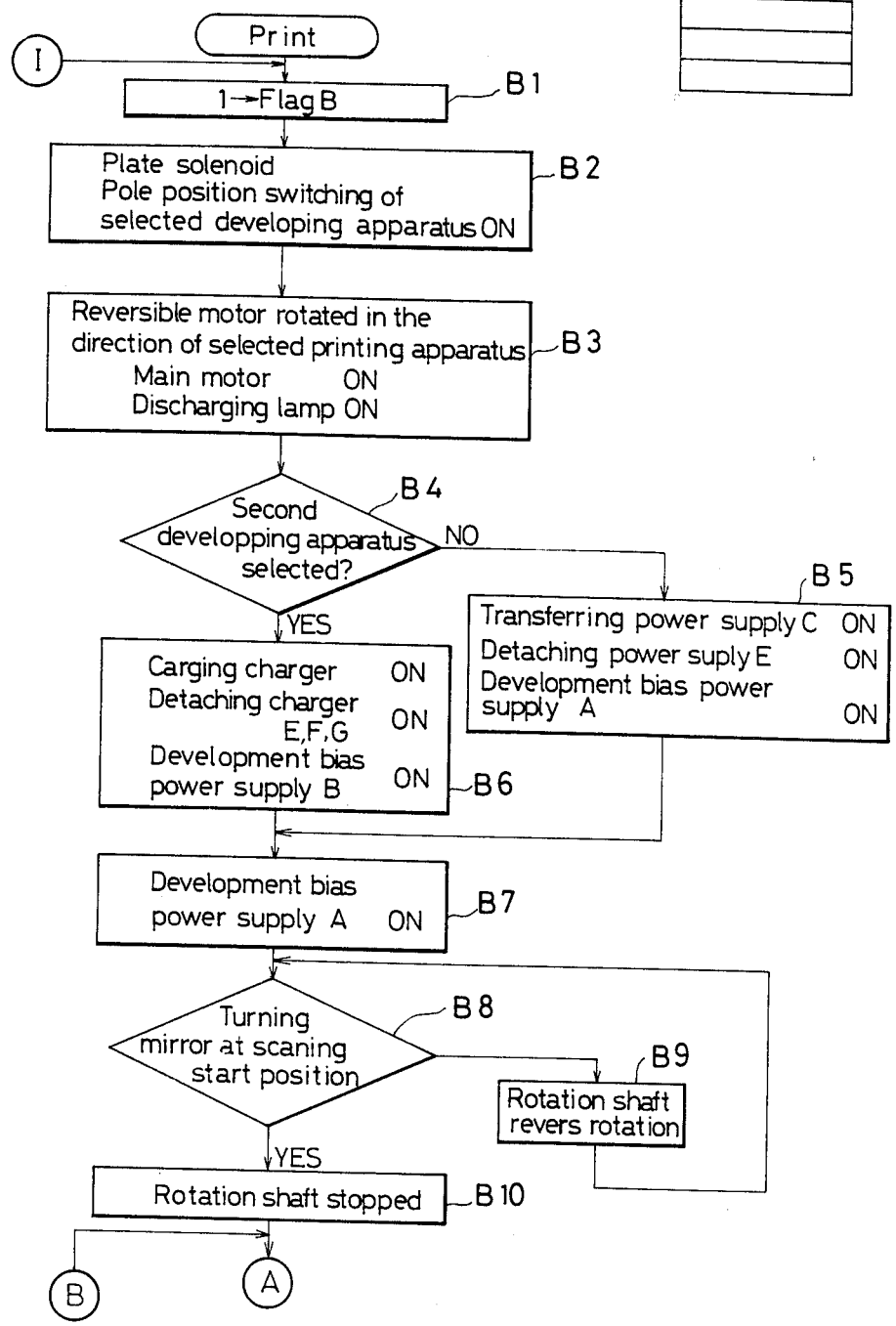

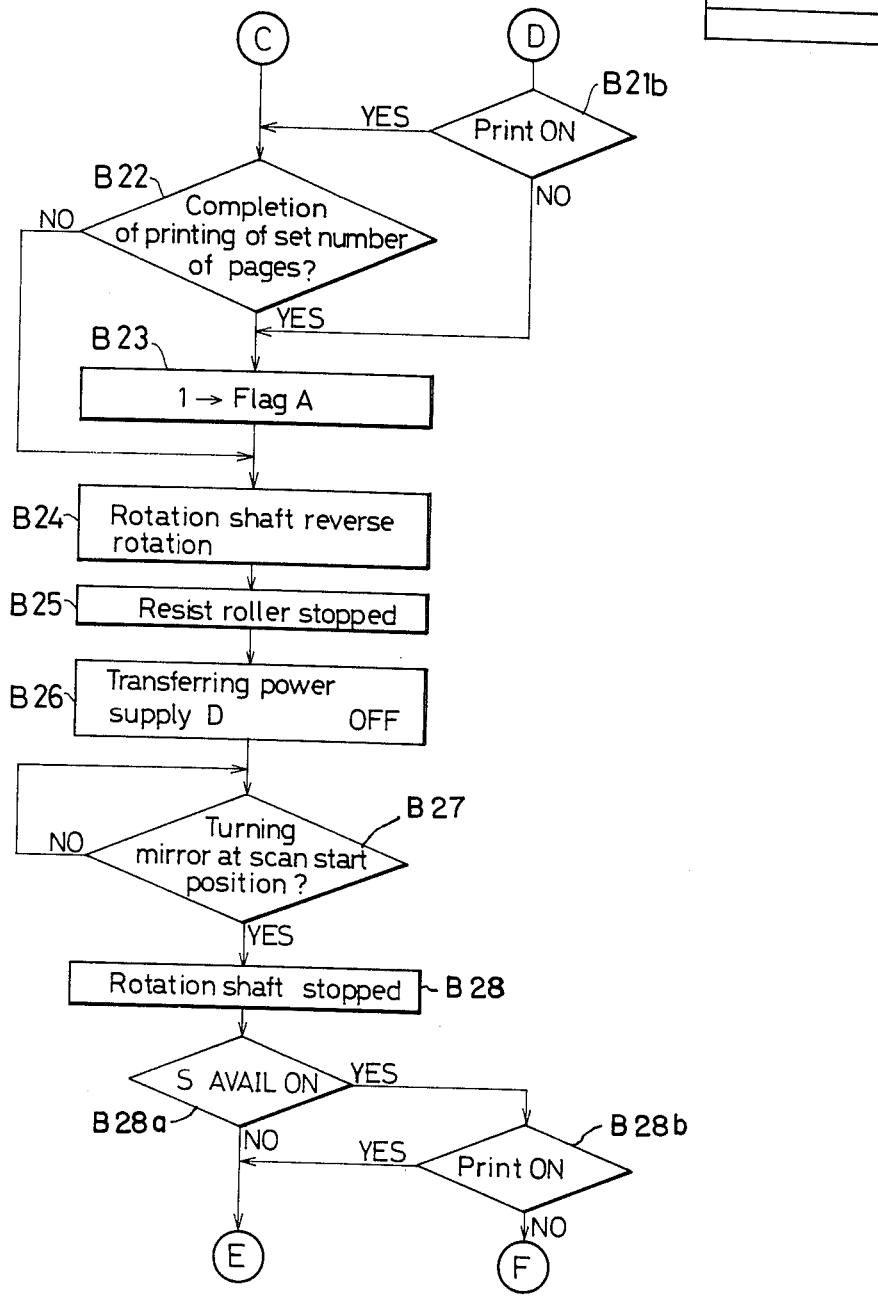

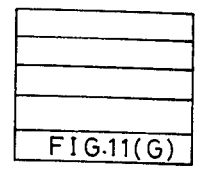
FIG.11(E)
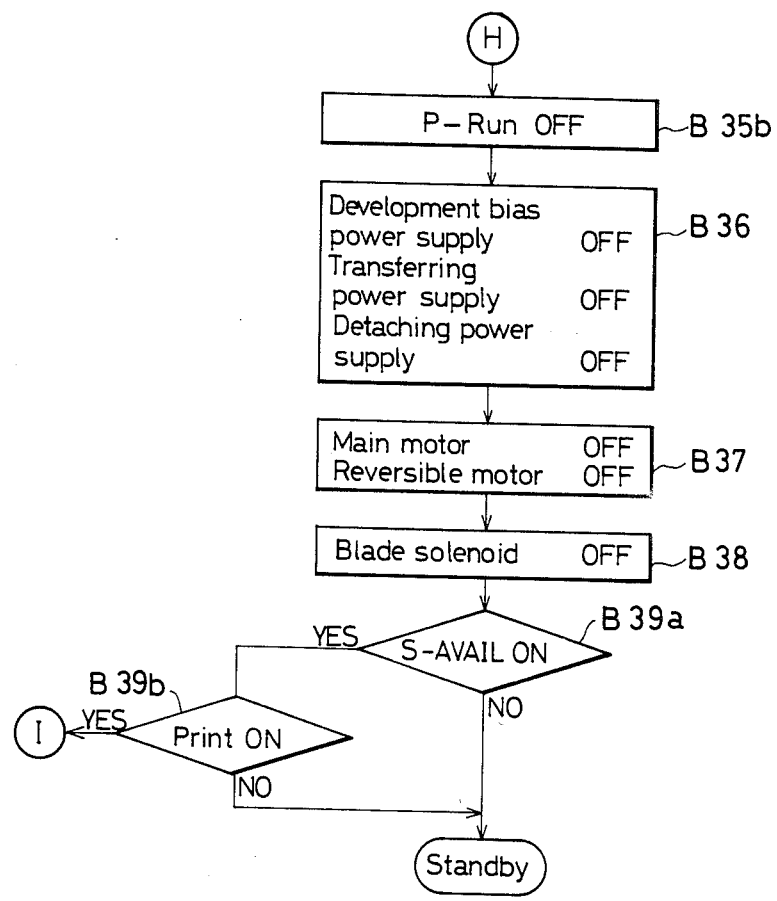

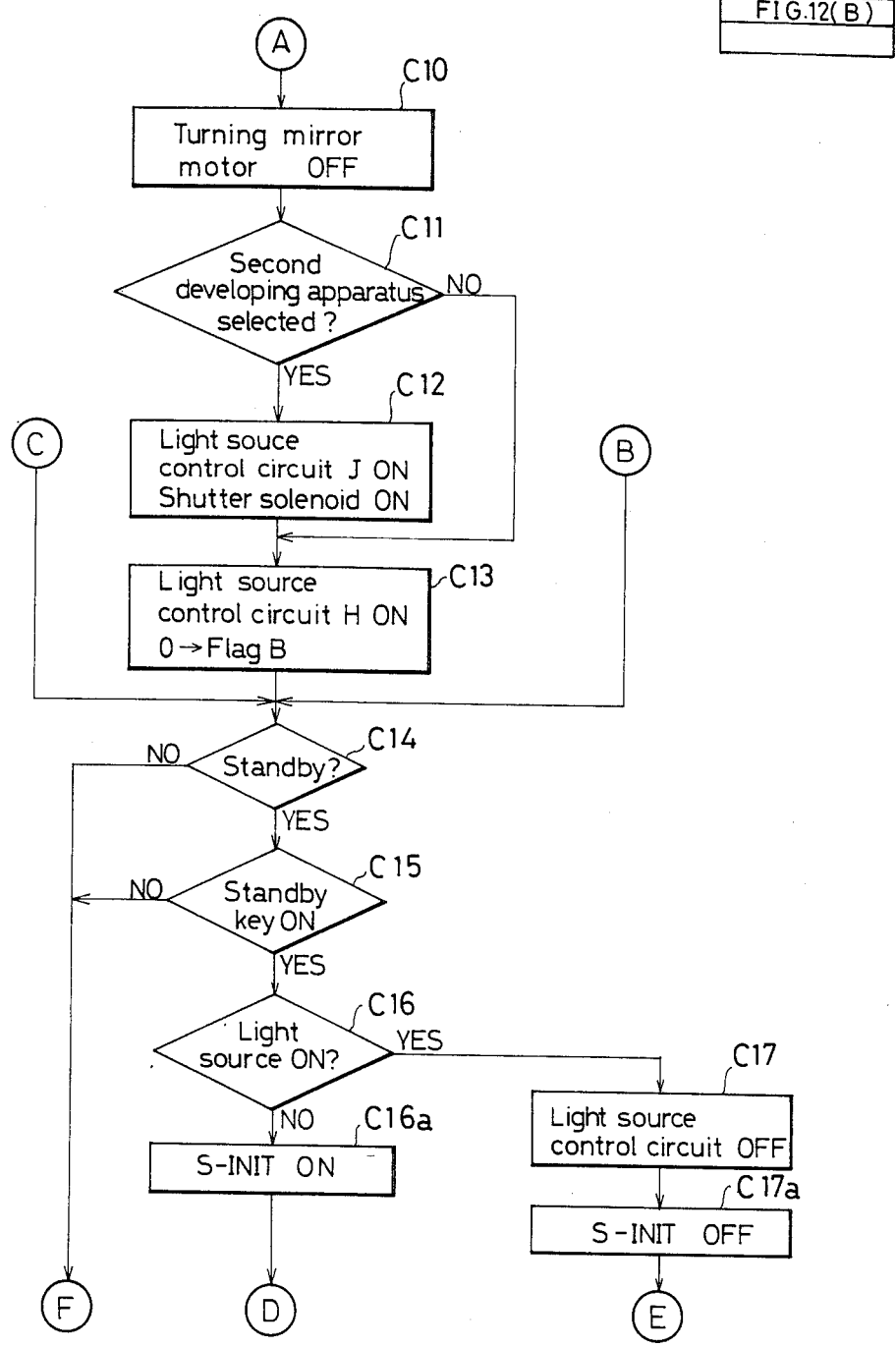

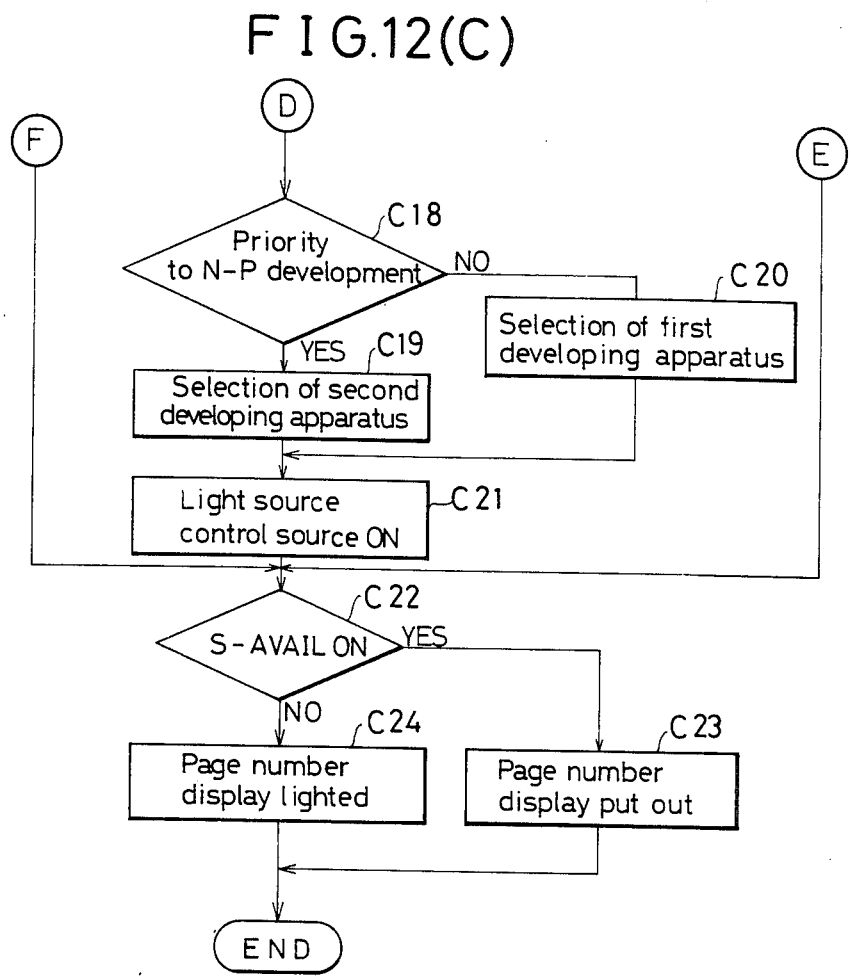

MICROFILM READER-PRINTER

BACKGROUND OF THE INVENTION

The present invention relates to a microfilm reader-printer which can carry out projection of a microfilm image on a screen and image formation on a carrier of formed image.

In a microfilm reader-printer of the above kind, the operator has to determine between which ones, among a plurality of peripheral apparatus that are connected to the body of the reader-printer, the transfer control of various kinds of signal is to be executed, and to start predetermined transfer of control by operating a selection switch, for example, of a selected object.

Further, there are some apparatus which adopt a configuration that makes the manual setting possible for specifying the priority order of a plurality of peripheral devices that are connected to the body of the reader-printer. In the case of such a configuration, the operator has to determine how to get the priority order, and has to manually operate according to the judgment selected.

Consequently, in the case of using the prior-art apparatus, there were sometimes caused miscontrol due to misjudgment or carelessness.

On the other hand, among microfilm readerprinter of this kind, there is proposed one whose body is constructed to be connectable to peripheral devices such as a page searcher. The page searcher may be set at a predetermined position of the reader-printer in such a way as to permit a continuous feeding or rewinding of a roll like recording medium, namely, microfilm, one image frame at a time. Projection on the screen and image formation operation on the image formation carrier, of a microfilm image is arranged to be achieved easily from the page searcher. In such a page searcher, setting of the number of pages to be printed continuously is also arranged to be achievable directly from the page searcher. However, in the prior-art page searcher, an image formation request signal which specifies the number of pages to be printed continuously is sent to the body of the reader-printer as a signal of predetermined bit number. The image formation request signal from the page searcher requires signal lines for 4 bits for a page searcher which may be set to 9 pages of printing, and signal lines for 7 bits for a page searcher which may be set to 99 pages. Accordingly, it becomes necessary lo provide an interface circuit for that purposes respectively for the page searcher and the reader-printer. On the other hand, if image formation execution is to be carried out by sheet, there was a problem that there is needed a very long time for the operation of a plurality of continuous image formations.

In addition, the number of continuously printable pages by the prior-art microfilm reader-printer does not necessarily coincide with the corresponding number that is required by the page searcher that is connected. For instance, when a page searcher which can request execution of 99 prints is connected to the body of a reader-printer that can designate continuous printings of up to 9 pages, and the page searcher requested a continuous printing of more than 9 pages, the reader-printer body is arranged to carry out a continuous printings of more than 9 pages. Because of this, there was a problem that the temperature is raised beyond a rated value or the amount of the toner becomes insufficient, in the body of the reader-printer.

SUMMARY OF THE INVENTION

An object of the present invention is to provide a microfilm reader-printer which possesses a satisfactory controllability.

Another object of the present invention is to provide a microfilm reader-printer which gives less chance of having malfunctions.

Still another object of the present invention is to provide a microfilm reader-printer which can cause a selective functioning of a peripheral device with highest priority.

Still another object of the present invention is to provide a microfilm reader-printer which can carry out formation of a large number of images without requiring a special interface.

Still another object of the present invention is to provide a microfilm reader-printer which can carry out image formation for a number of pages that exceeds the continuously processable ability of the reader-printer body, by operation of just one time.

BRIEF DESCRIPTION OF THE DRAWINGS

FIG. 9 is an overall system configuration of a microfilm reader-printer embodying the present invention.

DETAILED DESCRIPTION OF THE PREFERRED EMBODIMENT

In what follows, an embodiment of the present invention will be described by making reference to the drawings.

Figure 1:
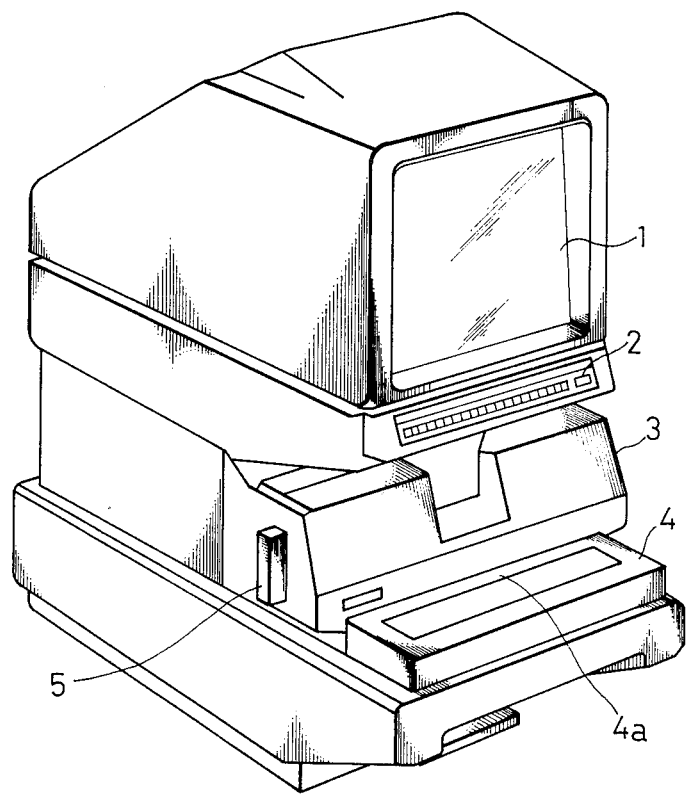
FIG. 1, is a perspective view which shows the appearance of a microfilm reader-printer embodying the present invention.

FIG. 1 is a perspective view which shows the appearance of a microfilm reader-printer embodying the present invention.

On the front side of the microfilm reader-printer there are provided a projection screen 1 for projecting a microfilm image by enlargement and a control panel 2 equipped with various kinds of operating keys.

Projection of a microfilm image and image formation on an image formation carrier are executed by mounting a cartridge film 5 on the reader-printer to which a film handler 3 and a page searcher 4 are attached as shown.

The film handler 3 is arranged to be able to feed microfilms, which are housed wound within the cartridge film 5 that is set on the left side of the figure, in the direction from the left to the right of the film handler 3, frame (page) by frame, based on an input from a control section 4a that is provided in the page searcher 4. By successively projecting pages on the screen 1 in this manner, for example, a desired microfilm (also called a page) can be searched. Here, the control section 4a provided on the page searcher has nearly the same configuration as the control panel 2 provided on the body of the reader-printer which is equipped with various kinds of operating keys and so on.

Next, referring to FIG. 2, the control section 4a will be described.

Figure 2:
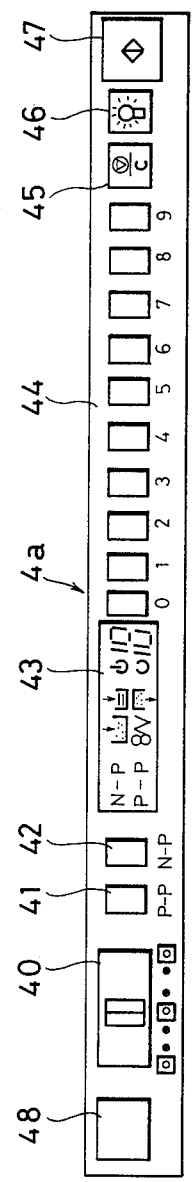
FIG. 2 is a front view of the control panel.

In FIG. 2, 40 is a volume for regulating the exposure, and 41 and 42 are P→P development selection key and N→P development selection key, respectively, which will be described later, for selecting two developing apparatus.

In addition, 44 is a print number setting key, 45 is a clear/stop key, 46 is a standby key, 47 is a print start key, and 48 is a main switch.

On a display board 43, N→P display, P→P display, toner refilling display, paper refilling display, paper jam display, print standby display, print enable display, print number display, and others are displayed based on signals from various sensors or the like. Further, the main switch 48 is a switch for starting the drive of the microfilm reader-printer, and by turning the main switch 48 on, a light source 10 in a film setting unit 6 is lighted and projection becomes possible. See, FIG. 3. Here, the difference between the control section 4a provided on the page searcher of the present embodiment and the control panel 2 provided on the body of the reader-printer is that the control panel 2 on the body can designate execution of continuous image formation (called printing hereinafter) to a maximum of 9 pages whereas the control section 4a provided on the page searcher can be set to continuous printings of up to 99 pages.

Figure 3:
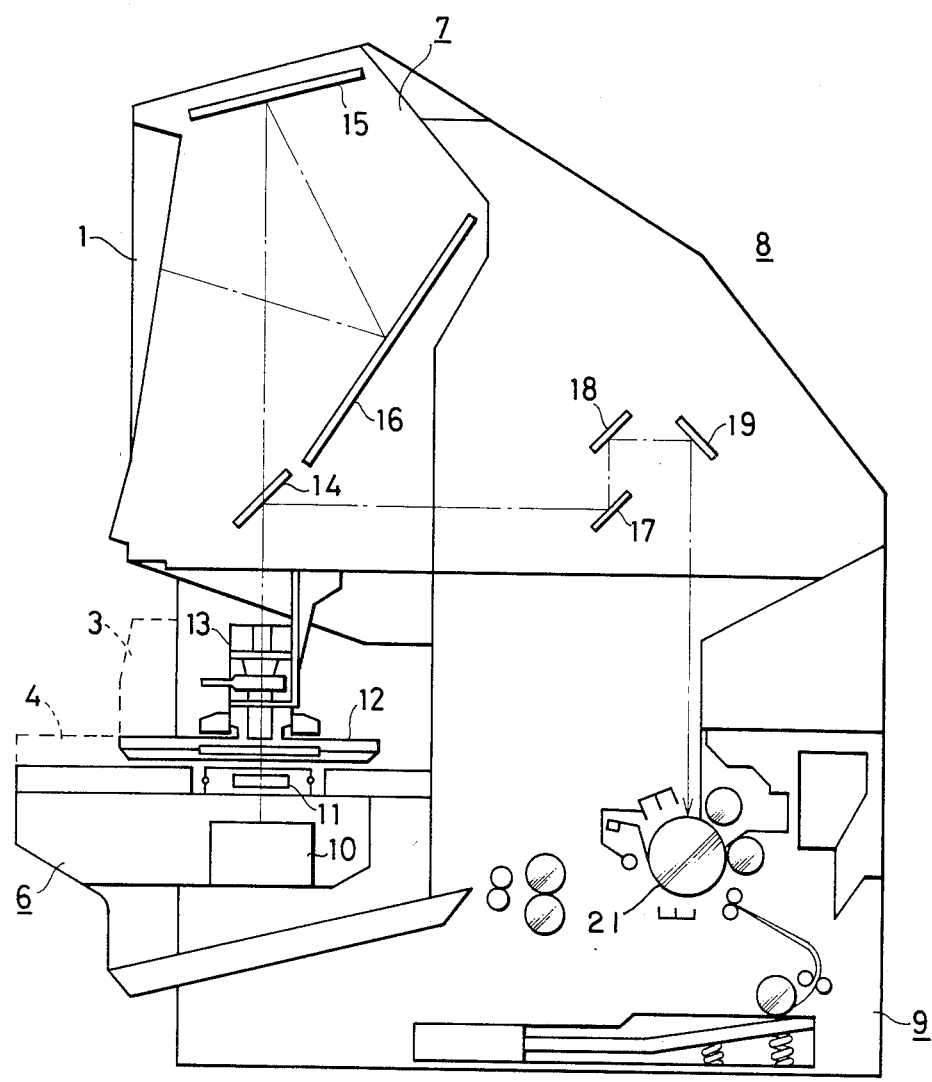
FIG. 3 is a diagram which shows the internal structure of the microfilm reader-printer shown in FIG. 1.

As shown in FIG. 3, the internal configuration of the microfilm reader-printer can be divided roughly into a film setting unit 6, projection unit 7, scanning light guiding unit 8, and image formation unit 9.

In the film setting unit 6, there are arranged on the path of light emitted from the light source 10, a condensing lens 11, film pressing plate 12, and lens case 13, in this order from the light source 10 side.

When light radiated from the light source 10 is condensed by the condenser 11 and is incident upon the rear surface of a microfilm which is held pressed by the film pressing plate 12, the light which passed through the microfilm impinges upon the lens case 13.

The lens case 13 on which can be mounted a lens with selected magnification chosen out of lenses with various magnifications, sends out the incident light to the projection unit 7 by magnifying it with the factor of the lens which is mounted.

In the projection unit, if the path of light sent from the mounted lens on the lens case 13 is not intercepted by a turning mirror 14, there will be projected an image of the microfilm on the projection screen 1, via mirrors 15 and 16.

On the other hand, when the path of light sent out from the mounted lens in the lens case 13 is intercepted by the turning mirror 14, there is projected an image of the microfilm on a photosensitive drum 21 of the image formation unit 9, via mirrors 17, 18, and 19.

Figure 4:
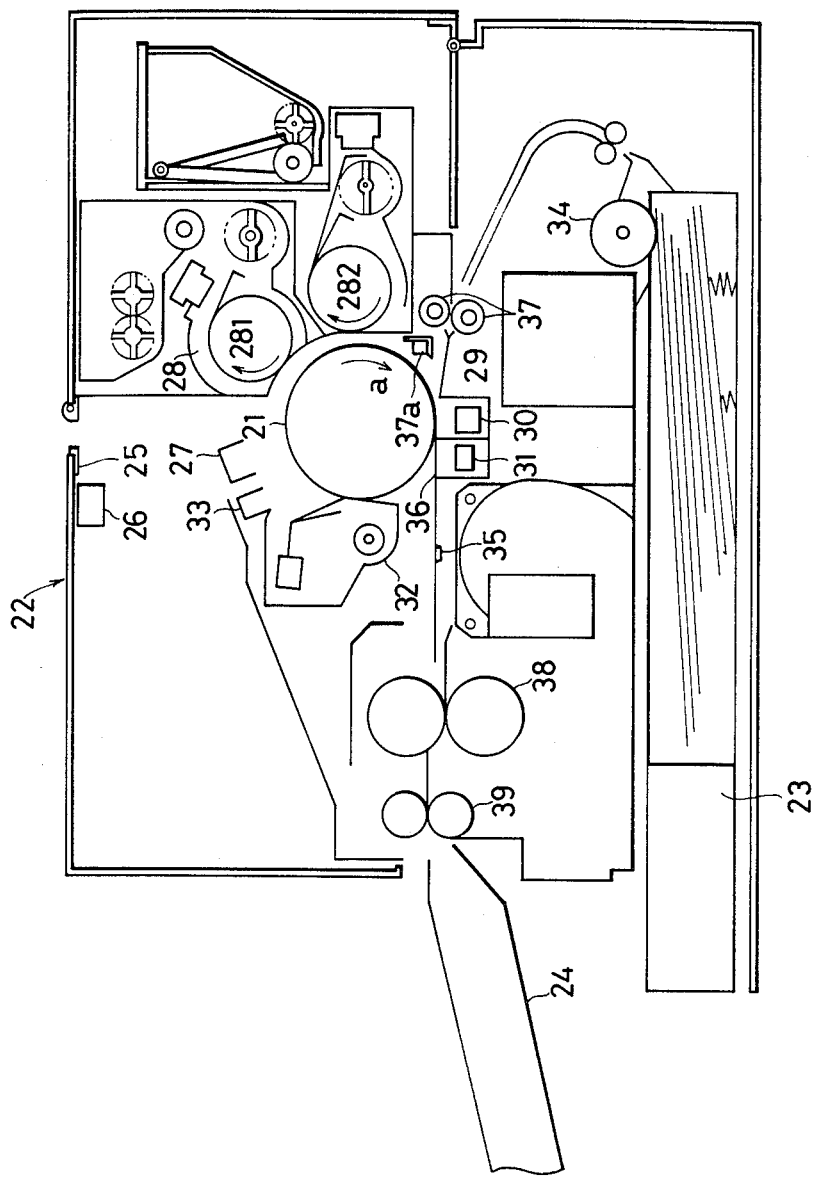
FIG. 4 is a diagram which shows a detailed configuration of the image formation unit of the microfilm reader-printer.

The image formation unit 9 of the microfilm reader-printer shown in FIG. 1 through FIG. 3 is constructed as illustrated in detail in FIG. 4.

In the image formation unit 9, 22 is the body of the unit, and on the lower front face side of the unit body 22, there is mounted a paper feeding cassette 23 above which is mounted a tray 24 for ejected paper. At about the center of the unit body 22, there is arranged a photosensitive drum 21 which serves as an image carrier. Above the photosensitive drum 21 there are provided a shutter mechanism 25 for screening the scanning light from the screening light guiding unit 8 (FIG. 3), and a driving solenoid 26 for the shutter mechanism.

In the surroundings of the photosensitive drum 21, there are arranged an electricity (or charge) charger 27, development device 28, pre-transfer discharger 29, transfer charger 30, detaching (or peeling) charger 31, cleaner 32, discharging lamp 33, and so on.

In the lower part of the unit body 22, there is formed a paper transporting route 36 which leads a paper that is taken out automatically from the paper feeding cassette 23 via a paper feeding roller 34 to resist rollers 37 through an image formation section which is formed between the photosensitive drum 21 and the transfer charger 30.

On the upstream side of the image formation section 36 of the paper transporting route 35, there are arranged resist rollers 37, and on its downstream side there are arranged heat rollers 38 and paper ejecting rollers 39.

As the photosensitive drum 21 is driven in the direction of the arrow a in the figure, it is first charged uniformly by the electricity charger 27, scanning light from the scanning light guiding unit 8 (FIG. 3) is focused successively on the photosensitive drum 21, and an electrostatic latent image is brought out explicitly developed by the development device 28 and is sent out toward the transfer charger 30. On the other hand, an image which was formed beforehand on the photosensitive drum 21 is transferred on to a paper which is supplied by the paper feeding cassette 23 and transported by the resist rollers 37, by the transfer charger 30. The paper on which is transferred the image, is peeled off the photosensitive drum 21 by the detaching charger 31, and is led to the heat rollers 38 by way of the paper transporting route 35. After the transferred image is fixed by melting, the paper is ejected to the tray 24 for ejected paper by the paper ejecting rollers 39. On the other hand, after transferring the image to the paper, the residual image on the photosensitive drum 21 is erased, and the residual image on the photosensitive drum 21 is erased, and the drum is prepared for the next copying operation. In addition, a paper detector 37a is provided in the neighborhood of the resist rollers 37 to detect the transported paper during execution of printing.

The development device 28 has a first development roller 28a and a second development roller 28b, and by a selective drive of the development roller 28a and 28b, both of a negatively recorded microfilm and a positively recorded microfilm can be made to be developed as positive images. Namely, the first developing apparatus 28a carries out positive→positive development while the second developing apparatus 28b carries out negative→positive development.

In the mode of carrying out the positive→development (called P - P development hereinafter), an image that is formed on the paper becomes brighter when the exposure to the lamp of the light source 10 is increased, and the image becomes darker when the exposure is decreased.

Further, in the development mode which carries out the negative→positive development (called N - P development hereinafter), an image that is formed on the paper becomes brighter when the exposure to the lamp of the light source 10 is decreased, and the image becomes darker when the exposure is increased.

Moreover, in the present embodiment, there is provided connection detecting means in the system configuration of the reader-printer body which generates a film handler installation signal (F-AVAIL) and a page searcher installation signal (S-AVAIL), when electrical connection is established by the fitting of the film handler 3 and the page searcher 4, respectively.

In addition, there is also provided control changing means which selects the control panel or control section which is given the priority when the signal F - AVAIL or S - AVAIL is generated.

Figures 5, 6:
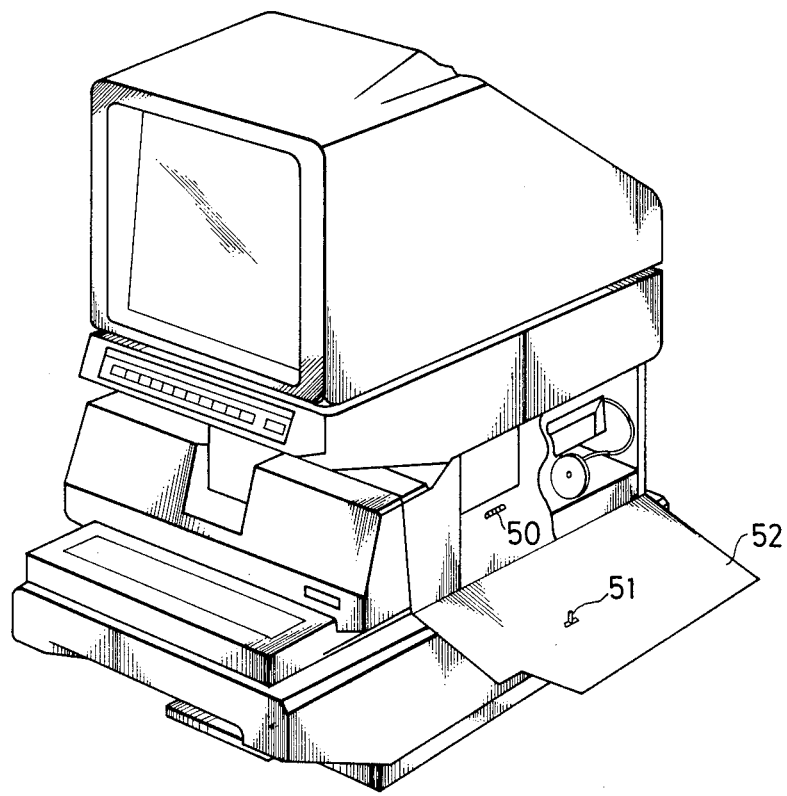
FIG. 5 is a diagram which shows the priority status in the mounting of the image formation units of the microfilm reader-printer.
FIG. 6 is a diagram for explaining the mounting operation of each peripheral device.

As shown in FIG. 5, the control changing means let the control panel of the reader-printer function when both of the F - AVAIL and S - AVAIL signals are in the off-state. Further, even when F - AVAIL is turned on, if S - AVAIL remains in the off-state, the control changing means also let the control panel of the reader-printer body function.

Now, when S - AVAIL is in the on-state and F - AVAIL is in off-state, the control section 4a of the page searcher 4 is activated to function. Moreover, when both of S - AVAIL and F - AVAIL are in on-state, the control section 4a of the page searcher 4 is also activated to function. It should be recalled that in reality there will be no case in which the system is used with the page searcher alone is attached.

In short, in the present embodiment, when the page searcher 4 is installed, this installment is given the highest priority.

Accordingly, during the time when the page searcher 4 is executing a page search, the reader-printer body cannot execute the printing operation. Only after the completion of the page search can the reader-printer body execute the printing operation.

Since the selection between the control panel of the page searcher 4 and the control panel of the reader-printer is carried out automatically in response to the order of priority, misoperation due to misjudgment or carelessness on the part of the operator can be avoided.

Further, in the present embodiment, there is provided a connecting terminal 50 on the side panel 52, which is positioned on the side opposite to where the cartridge film is placed, as shown in FIG. 6, as a junction section for carrying out transfer of various kinds of signal between the film handler 3 and the page searcher 4. The connecting terminal 50 carries out the function of isolating the power supply for the reader-printer when the insertion and pressing of a pin 51 is released by the opening of the side panel 52. Only when the connecting terminal 50 isolates the power supply for the reader-printer body, it is made possible to attach or detach the film handler 3 and the page searcher 4 for the reader-printer body.

In other words, the power supply is isolated whenever the connector of the film handler 3 or the page searcher 4 is attached to or detached from the reader-printer body. Therefore, damages to the electrical parts which would occur due to a rush current that would be generated if the power supply were connected, can be prevented. Moreover, the danger of having electric shocks can be avoided since the connecting terminal 50 cannot be touched by hand when the panel is closed.

Furthermore, in the present embodiment, there is provided means of generating a CARTRIDGE signal when the cartridge film 5 is installed in the film handler 3.

Figure 7:
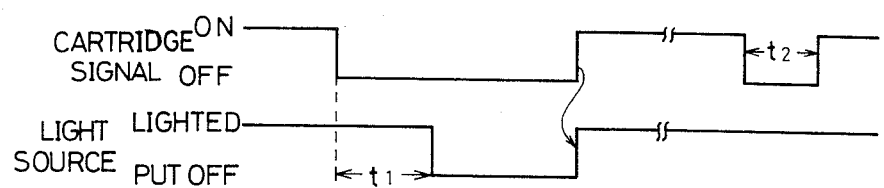
FIG. 7 is a time chart which shows the relationship between the attaching and detaching of the cartridge film, and the ON/OFF of the light source.

Moreover, there is also provided in the present embodiment, means which turns off the light source 10 by the generation of a time-up signal in te timer, after elapse of a predetermined time t1 after the actuation of the timer of the reader-printer body that is caused by the turning-off of the CARTRIDGE signal due to detachment of the cartridge film 5 from the film handler 3, as shown in FIG. 7.

Still further, there is provided means which lights up the light source 10 at the same time when the cartridge film 5 is loaded in the film handler and the CARTRIDGE signal is turned on.

Further, even when the CARTRIDGE signal is turned off and the timer of the reader-printer body is started, if the cartridge is loaded at time t2 before elapse of the predetermined time t1, counting by the timer is cancelled and the light source 10 is left in the on-state.

Further, in the present embodiment, there is provided means to generate a signal to show that the film handler 3 and the page searcher 4 are working, and the system is given a structure which forbids the printing operation of the reader-printer body while the above signal is being output.

Moreover, in the present embodiment, if at least one of the page searcher (P/S) connection signals which shows that the page searcher 4 is electrically connected to the reader-printer body and the P/S power supply closing signal which shows that the power supply to the page searcher is closed, is in off-state, it is arranged to stop the function of input-output means in the control section of the reader-printer body.

Figure 8:
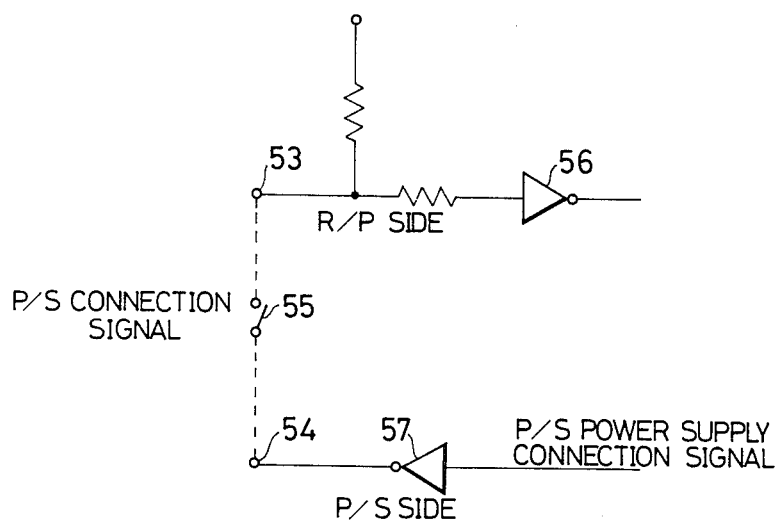
FIG. 8 is a circuit diagram which shows schematically the relationship between the connection of a peripheral device and its operation.
Figure 10A:
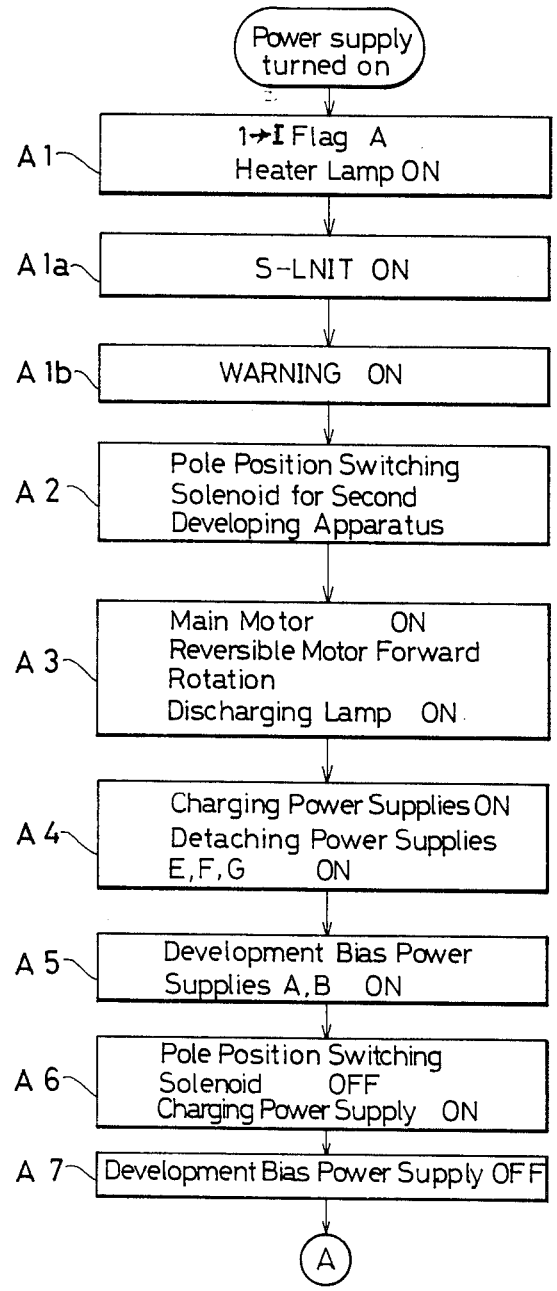
FIG. 10 is a flow chart which shows the printing operation at the time of the closing of the power supply system as detailed in FIG. 10(A) to FIG. 10(G).
Figure 10D:
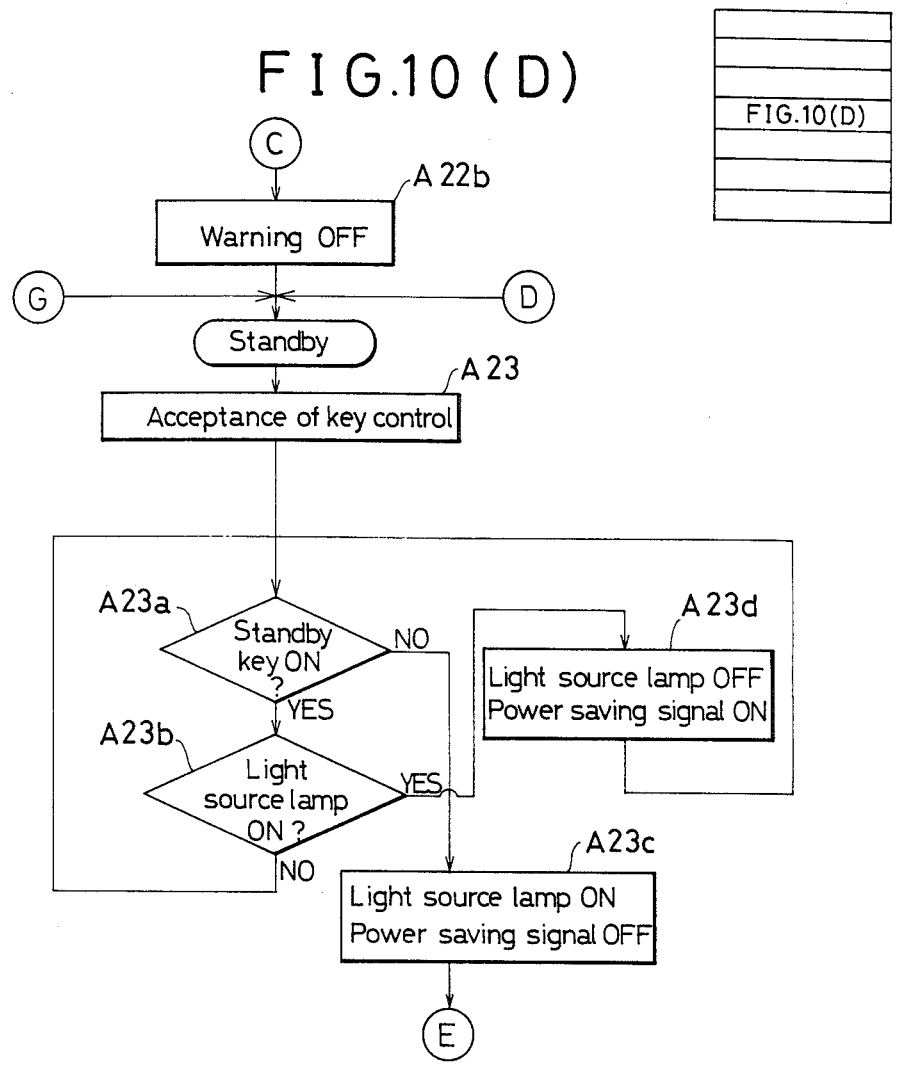
Figure 10F:
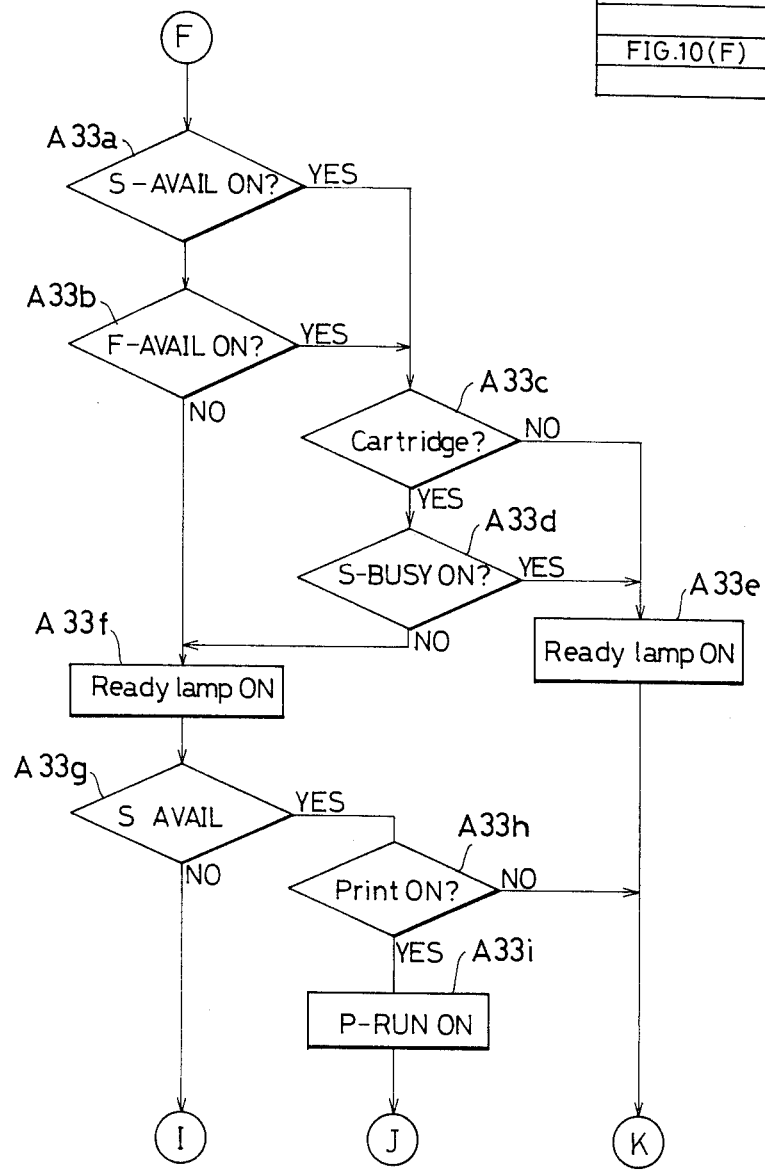
Figure 11B:
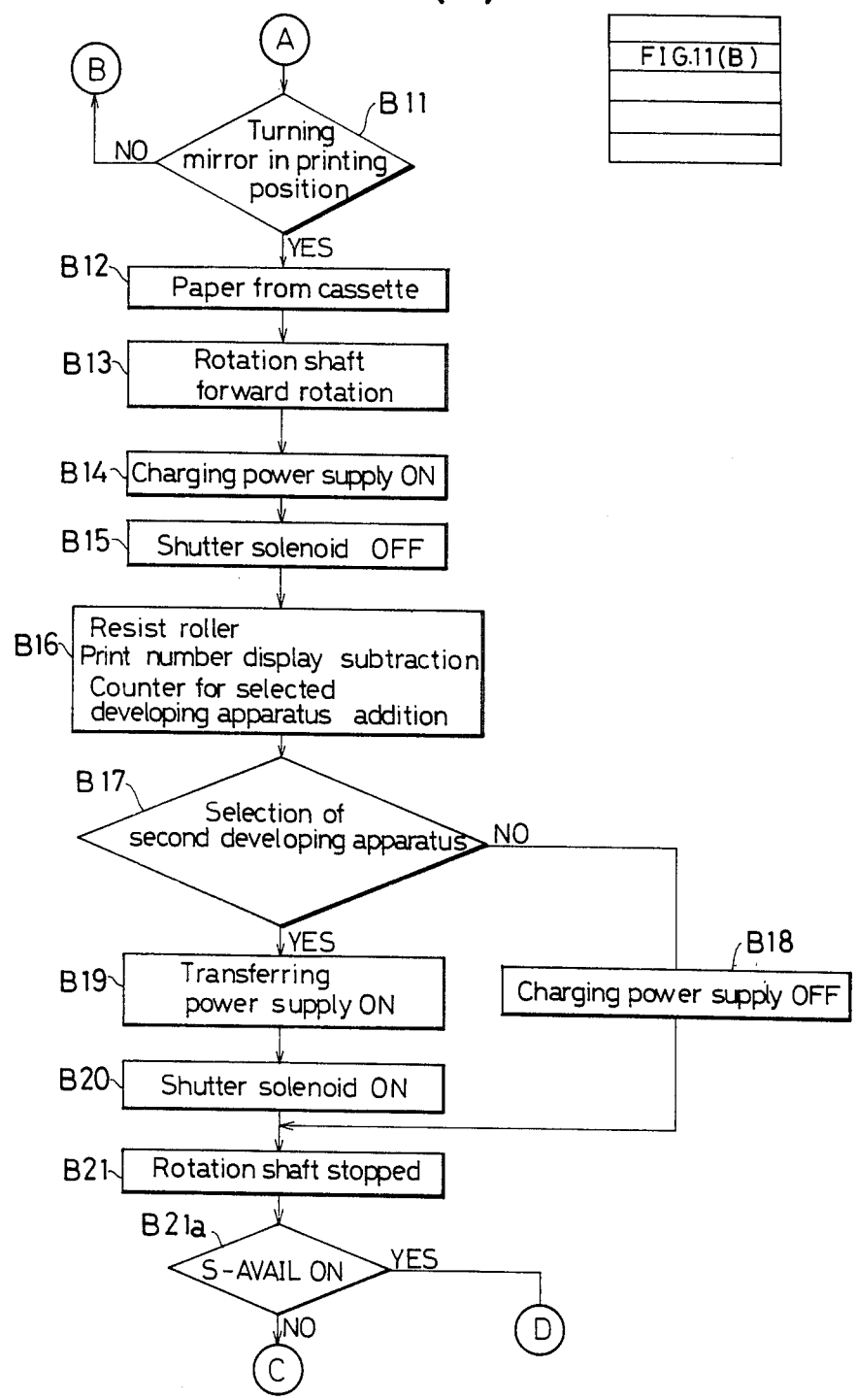
FIG. 11 is a flow chart which shows the printing operation at the time of closing of the power supply as detailed in FIG. 11(A) to FIG. 11(E).
Figure 11D:
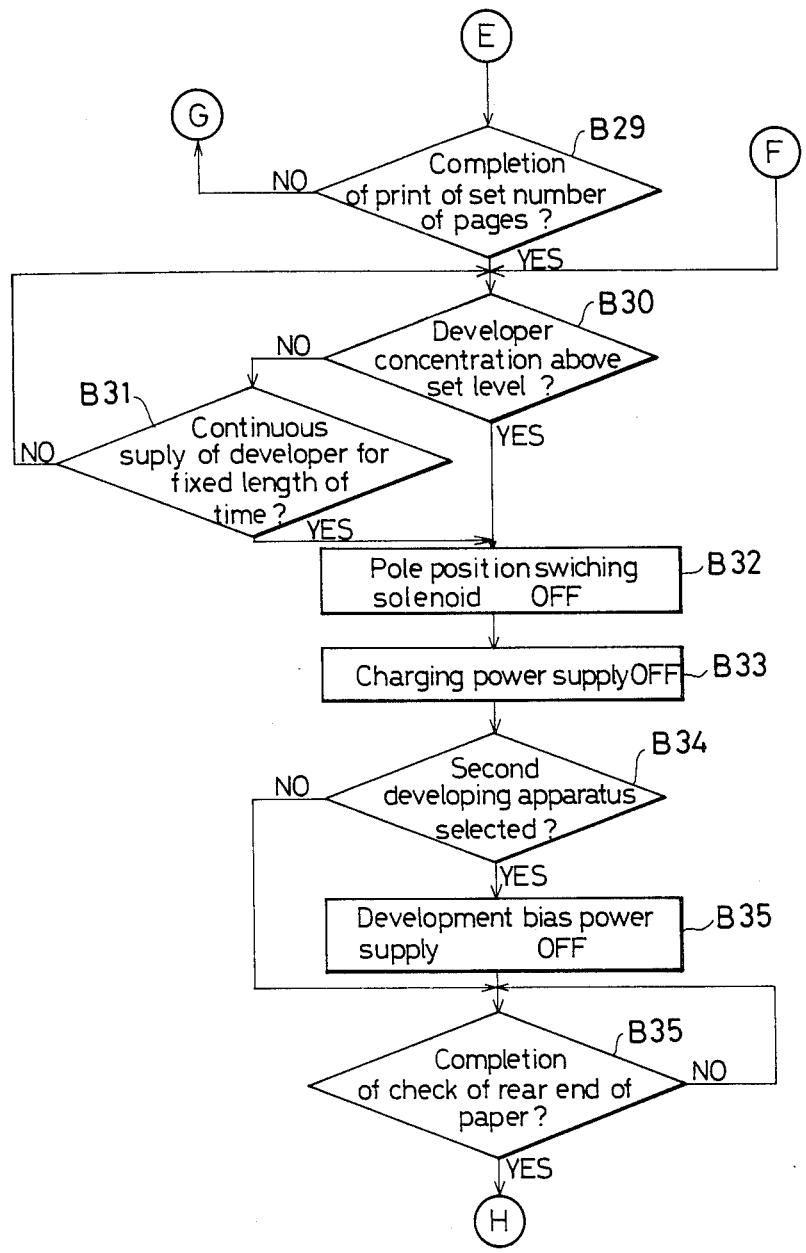

For instance, as shown in the schematic circuit diagram of FIG. 8, when a P/S connection signal is generated, the virtual contact 55 between the receiving terminal 53 on the reader-printer (R/P) side and the transmitting terminal 54 on the P/S side is closed.

When the virtual contact 55 is open, the input side of the inverter 56 becomes high impedance state. In addition, even if the virtual contact 55 is closed, the input side of the inverter 56 is in high impedance state when there is not applied a P/S power supply closing signal from the inverter 57 to the transmitting terminal 54.

At any rate, the output of the inverter 56 is on LOW level if the input side of the inverter 56 is in high impedance state.

If a P/S power supply closing signal is applied from the inverter 57 to the transmitting terminal 54 when the virtual contact 55 is closed by a P/S connection signal, the input side of the inverter 56 becomes low impedance state so that the output of the inverter 56 becomes HIGH level.

Since the P/S connection signal and the P/S power supply closing signal use a common signal line, the control program for communication can be simplified.

Further, in the present embodiment, when there occurs in the reader-printer body an abnormality such as paper jamming, no paper, insufficiency of the toner in the developer, and so forth, occurrence of the abnormality is given as a warning by a peripheral device such as page searcher 4, and the content of the abnormality is displayed in the reader-printer body.

The system of configuration of an embodiment of the present invention which includes configuration of various parts as in the above, is as shown in FIG. 9.

Microcomputer 60 with such a system configuration serves as the overall control center of the microfilm reader-printer, and it has an input interface circuit 61, an output interface circuit 62, and an internal memory.

The input interface 61 is connected electricaly to an input switch 63 of the control panel, various kinds of switches and sensors 64, and a developer concentration detector 65, a developer residual detector 66, developing apparatus presence signal generating means 67, of the first developing apparatus 28a, and a developer concentration detector 68, a developer residual detector 69, and developing apparatus presence signal generating means 70 of the second developing apparatus 28b, a control input 71 for the page searcher 4, a paper detector 37a, and other input means.

The output interface 62 is connected electrically to a display 72 of the control panel, a pole position switching solenoid 73, a reversible motor 74, a development bias power supply 75, a charging power supply 76, a transfer power supply 77, a detaching power supply 78, discharging lamp 79, a main motor 80, a shutter solenoid 81, a turning mirror motor 82, a light source control circuit 83, a heater control circuit 84, various kinds of solenoids 85, a page searcher control output 86, and others.

Further, the development bias power supply 75 is connected to a magnetic roller 75'; the charging power supply 76 is connected to the electricity charger 27, the transfer power supply 77 is connected to the transfer charger 30, the detaching power supply 78 is connected to the detaching charger 31, the light source control circuit 83 is connected to the light source 10, and the heater control circuit 84 is connected to a heater lamp 88.

The microcomputer 60 controls the sending of pulse signal to the page searcher 4 that is connected for each image formation (printing) operation performed. In addition, the microcomputer 60 has a function that when it does not receive a print request signal from the connected page searcher within a predetermined time after transmission of a pulse signal, it controls to stop the printing operation, and when it receives a print request signal, it controls to continue the printing operation. Since a pulse signal is transmitted every time when printing operation is carried out, it can function with a minimum of interface circuit, without requiring a large number of interfacing circuits such as input output IC, transistor, and so on. In addition, the predetermined time is the time which it takes to feed a paper, on which an image is to be formed, to the body of the reader-printer.

A memory 60a stores and controls the maximum continously printable number of pages by the reader-printer body that will be described later, at the time of execution of printing. Namely, the number in question is the number of pages to be printed that is set beforehand on the side of the reader-printer in the state where the page searcher which is a peripheral device is not connected, and it represents the maximum number that can be designated, for example, on the control panel.

The microcomputer 60 has a function of controlling the sending of a pulse signal to the page searcher 4 that is connected every time when printing is done. Moreover, it controls to stop the printing if no print request signal is received from the page searcher 4 that is connected, within a predetermined time after the transmission of the pulse signal. Since a pulse signal is transmitted every time when printing is executed as above, there are not required, contrary to the case in the priorart system, a large number of interface circuits such as input-output IC's and transistors, needing only a minimum of interface circuits. In addition, the microcomputer 60 has a function to judge whether there was an input of a print request signal from the peripheral device within a predetermined time after transmission of a pulse signal to the peripheral device.

The paper detector 62 is for detecting the transportation of the paper during printing operation, and based on its output, the microcomputer 60 which acts as the control section transmits a pulse signal to the page searcher 4 connected at every time when printing is executed.

On the other hand, the page searcher 4 which is a peripheral device, can set the number of printings to be carried out, for the reader-printer body to which it is connected. In addition, the page searcher 4 can arbitrarily select a film to be printed from the cartridge film that is set in the reader-printer. The page searcher with such a function stores the number of prints to be carried out continuously which is input from the control section 4a in a counter that is provided but not shown in the control section. The number of prints to be carried out continuously thus stored is reduced corresponding to the number of pulse signals for printing counting that is sent from the reader-printer body. When the number in the counter becomes zero, the page searcher 4 judges that the printing to be executed is completed, and stops sending the print request signal.

Next referring to the flow charts shown in FIGS. 10(A) through 10(G), the operation of the system with the above configuration will be described. First, with the connection to the power supply, it proceeds to step A1. In step A1, "1" is set to flag A in order to carry out the projection of a film on the screen within the interruption processing that will be described later, and turns on the heater lamp for the heat rollers 38. After the processing in step A1 is completed, connection of the power supply to the reader-printer body is notified to the page searcher 4 by turning on S-INIT in step A1a, and it proceeds step A1b. In step A1b, the WARNING signal is turned on to urge to examine the state display of the reader-printer, and announces by the display means that the reader-printer is warming up. At this time, the "PRINT" key is forbidden to be accepted. In the subsequent step A2, the pole position switching solenoid for the second developing apparatus 28b is turned on, and proceeds to step A3. In step A3, the main motor is turned on, the reversible motor is rotated backward, the discharging lamp 79 is turned on, and it proceeds to step A4. Then, the second developing apparatus 28b is driven, and on the surface of its development roller there is formed a developer magnetic brush. In step A4, the charging power supply 76 and the remote signals E, F, and G of the detaching power supply 78 are turned on before proceeding to step A5. In step A5, the remote signals A and B of the development bias power supply 75 are turned on with the timing in which the starting point for charging on the photosensitive drum 21 arrives at the developing region of the second developing apparatus 28b, and proceeds to step A6. In step A6, the pole position switching solenoid and the charging power supply are turned off, and in step A7 the development bias power supply is turned off with the timing in which the point at which charging on the photosensitive drum 21 was completed in step A5 arrives at the developing region of the second developing apparatus 28b, before proceeding to step A8. In step A8, reversible motor and the detaching power supply are turned off, and proceeds to step A9. Here, the developer magnetic brush is removed from the surface of the development roller of the second developing apparatus 28b. In step A9, the pole position switching solenoid of the first developing apparatus 28a is turned on, and proceeds to step A10. In step A10, it proceeds to step A11 by rotating the reversible motor in the forward direction. In this step the first developing apparatus 28a is activated, and a developer magnetic brush is formed on the surface of the development roller. In step A11, the remote signal of the detachment power supply 78 is turned on, and proceeds in step A12. In step A12, the resist rollers 37 are rotated before proceeding to step A13. In step A13, whether or not a paper is on the paper path is checked using sensor or the like for detecting the presence of the paper that is provided on the paper path. If it is detected that there is a paper, it proceeds to step A14. In step A14, whether a predetermined time elapsed since the start of rotation of the resist rollers in step A12. The predetermined time here means a time which is sufficient to have a paper in the apparatus to be ejected completely to the outside. If the predetermined time has not passed yet, it goes to stop A13. If on the other hand the predetermined time has already passed, it means that there was generated a jamming of the power in the apparatus, so that the abnormality is taken care of after displaying the content of the abnormality (step A14a). On the other hand, if it is found that there is no paper on the paper path in step A13, it proceeds to step A15. In step A15, the pole position switching solenoid is turned off before proceeding to step A16. In step A16, the main motor 80, the reversible motor 74, the discharging lamp 73, the detachment power supply 78, and the resist rollers 37 are brought to stop, and proceeds to step A17. Here, the developer magnetic brush is removed from the surface of the first developing apparatus 28a. In step A17, it is checked whether or not at least one of the developing apparatus is installed by means of the developing apparatus presence signal generating means of the first developing apparatus 28a and the second developing apparatus 28b, and it proceeds to step A18 if both are not installed. In step A18, the heater lamp is turned off, the N-P, P-P and PRINT ENABLE displays on the control panel are put out, and the system is put to the standby state, that is, the state in which the printing operation is not being carried and the heat rollers 38 are at a temperature that can carry out fixing. If in step A17 it is found that at least one of the developing apparatus is installed, then it proceeds to step A19. In step A19, check is made whether or not the selection of the N-P development should be given a priority, by the use of a controlled PC switch or the like which is not shown. If a priority is to be given to the N-P development, it proceeds to step A20 to select the second developing apparatus 28b, and then proceeds to step A22. On the other hand, if priority is not given to the N-P development, it proceeds to step A21 to select the first developing apparatus 28a, and then proceeds to step A22. In step A22, a check is made about whether or not the warming-up of the heat rollers is completed. A subroutine processing that will be described later is executed in step A22a until the warming-up is completed, and upon completion of warming-up, WARNING is turned off A22b and notifies the page searcher 4 that the reader-printer body is in the standby condition. Then, the symbol for print enable on the control panel 2 is lighted to indicate that it is in the standby condition, and becomes ready in step A23 to accept a key operation of the control panel 2.

When the standby key, which is the subsequent selection means to step A23, is depressed, namely, when the power saving mode is selected, the state of the standby key is checked in step A23a, and it proceeds to step A23b if it is in on-state whereas it proceeds to step A23c if it is in off-state. In step A23b, lighting of the light source lamp is checked, and if it is found that it is in the lighted state, it proceeds to step A23d to put out the light source lamp and to turn on the power saving signal, and returns to immediately before step A23a. If the light source lamp is not in the lighted state in step A23b, it goes back to immediately before step A23a. In this way, by putting out an unnecessary light source lamp in the standby but unused state of the apparatus, namely, by selecting the power saving mode, it becomes possible to save energy. In addition, by so doing it becomes possible to prolong the life of the light source lamp, and hence reduce the number of times of exchanging the light source lamp. On the other hand, if the standby key is not depressed in step A23a, the light source lamp is turned on and the power saving signal turned off before proceeding to step A24. In step A24, whether or not the second developing apparatus 28b is installed is checked by the developing apparatus presence signal from the second developing apparatus 28b, and it proceeds to step A25 if it is not installed. In step A25, whether or not the first developing apparatus is installed is checked by the developing apparatus presence signal from the first developing apparatus 28a, and if it is found not installed, then it returns to the standby condition.

On the other hand, if the second developing apparatus 28b is installed in step A24, it proceeds to step A26. In step A26, whether or not the first developing apparatus 28a is installed is checked, and it proceeds to step A27 if it is installed. In step A27, whether or not the second developing apparatus is selected currently is checked, and it proceeds to step A28 if the second developing apparatus is not selected. In step A28, whether or not the N-P selection key on the control panel is turned on is checked, and if it is found to be turned on, or if the developing apparatus 28a is not installed in step A26, then it proceeds to step A29. In step A29, it proceeds to step A32 by selecting the second developing apparatus. On the other hand, if the second developing apparatus is selected in step A27, it proceeds to step A30. In step A30, whether or not the P-P selection key on the control panel is turned on is checked. If it is found to be turned on, or if the first developing apparatus is installed in step A25, it proceeds to step A31. In step A31, it proceeds to step A32 after selecting the first developing apparatus 28a. On the other hand, if the N-P selection key is turned on in step A28, or if the P-P selection key is not turned on in step A30, it proceeds to step A32 without changing the selection of the developing apparatus. As in the above, the present system forbids the installation of the developing apparatus if both of the first developing apparatus 28a and the second developing apparatus 28b are not installed, or either one of them is not installed. In step A32, whether or not there is abnormality within the apparatus is checked. If there exists an abnormality, the abnormality is corrected after displaying the content of the abnormality (step A32a), and it proceeds to step A33 if there is not abnormality. In step A33, whether or not there are papers in the paper feeding cassette 23 is checked, and it returns to the standby condition if there is no paper left, whereas it proceeds to the processings including and subsequent to step A33a if there are still some papers left. Namely, in step A33a it is judged whether or not the page searcher 4 is installed, and it proceeds to step A33c if it is installed (affirmation of step A33a) and it proceeds to step A33b if it is not installed (negation of step A33a). Here, in affirming step A33a, it is judged that the film handler 3 is also installed. In step A33b, whether or not the film handler 3 is installed is checked, and it proceeds to step A33c if it is installed (affirmation of step A33b) and it proceeds to step A33f if it is not installed (negation of step A33b). In step A33c, it is judged whether the cartridge film 5 is mounted, and it proceeds to step A33d if it is mounted (affirmation of step A33c) and it proceeds to step A33e if it is not mounted (negation of step A33c). In step A33d, it is judged whether the system is executing the page search, and it proceeds to step A33e if it is executing page search (affirmation of step A33d) and proceeds to step A33f if it is not executing page search (negation of step A33d). In step A33e, it is either the cartridge film 5 is not mounted or it is executing a page search, so that the READY lamp of the reader-printer body is turned off and goes into the standby state as is, and proceeds to step A35 through the subroutine processing in step A34a that will be described later. In step A33f, the READY lamp is lighted to proceeds to step A33g and whether the page searcher 4 is installed is judged once more. Here, if the page searcher 4 is installed (affirmation of step A33g), it proceeds to step A33h to forbid the PRINT START from the control panel. If it is not installed (negation of step A33g), it proceeds to step A34. In step A33h, whether or not a print request is issued from the page searcher 4 is judged, and it proceeds to step A33i if there is issued one (affirmation of step A33h) and it proceeds to step A35 if there is not issued one (negation of step A33h). Here, the reason for proceeding to step A35 but not to step A34 when there is not issued a print request (negation of step A33h), is that when the page searcher 4 is installed, only the "N-P", "P-P", and "LLP" keys of the keys on the reader-printer body are effective, and the PRINT key is forbidden from being accepted. In step A33i, it is indicated that the reader-printer body is in the midst of printing so that it proceeds to step A33j by turning on P-RUN to set the print setting number to 9. This is done so to control the number of continuous prints at one time in order to keep the specific concentration of the toner in the developing apparatus at a constant value for all time, and in so doing, the number of prints is arranged to be counted independently by the reader-printer body. It should be noted that the number of prints is counted also by the page searcher 4. Next, in step A33k, whether or not the system is in the Add Toner state is checked, and if it is not in the Add Toner state (negation of step A33k), it proceeds as is to printing, and if it is in the Add Toner state (affirmation of step A33k), then the WARNING is turned off. This is arranged in this way, because printing may be executed even in the Add Toner state, to permit the page searcher 4 to discriminate a jam that occurred during printing from a jam that did not. Then, it proceeds to print. In step A34, it checks whether or not the PRINT key on the control panel 2 is turned on, and it proceeds to the printing operation that will be described later if it is in on-state, and it proceeds to step A35 if it is not in on-state. In step A35, it returns to the standby state if a key on the control panel 2 was operated within a predetermined time, and it proceeds to step A36 if such operation was not given. In step A36, the set number of prints is set at 1, and it returns to the standby state.

Next, if the print key for the process shown in the flow charts, FIGS. 11(A) through 11(E), is depressed, it proceeds to step B1. In step B1, 1 is set for flag B in order to move the turning mirror 14 to the printing position within the interruption processing that will be described later, and to light up the light source 10 according to the selected printing mode, and proceeds to step B2. In step B2, the blade solenoid of the cleaner 32 is turned on and the pole position switching solenoid of the selected developing apparatus is turned on, an it proceeds to step B3. In step B3, the reversible motor is rotated in the direction of the selected developing apparatus, the main motor and the discharging lamp are turned on, and then it proceeds to step B4. In step B4, it is checked whether or not the selected developing apparatus is the second developing apparatus 28b, and it proceeds to step B5 if the second developing apparatus is not selected. In step B5, the remote signal C of the transfer power supply, the remote signal E of the detachment power supply, and the remote signal A of the development bias power supply are turned on before proceeding to step B7. On the other hand, if the second developing apparatus is selected in step B4, it proceeds to step B6. In step B6, the charging power supply, and the remote signals E, F, and G of the detachment power supply, and the remote signal B of the development bias power supply are turned on, and it proceeds to step B7. In step B7, the remote signal A of the development bias power supply is turned on with the timing at which the starting point of charging on the photosensitive drum 21 in step B6 arrives at the developing position of the second developing apparatus 28b, and it proceeds to step B8. In step B8, whether or not the turning mirror 14 is in the scan start position is checked, and if it is in the scan start position, it proceeds to step B10. If it is not the scan start position, the rotation shaft of the turning mirror is rotated in step B9 in the reverse direction, namely, in the clockwise direction of FIG. 3, in order to pull it back in the direction of the scan start position, and it proceeds to step B10. In step B10, the rotation of the rotation shaft is stopped, and it proceeds to step B11. In step B11, whether the turning mirror 14 is in the printing position is checked before proceeding to step B12. In step B12, the paper feeding operation from the paper feeding cassette 23 is started, and it proceeds to step B13. In step B13, the film operation is started by rotating the shaft of the rotation shaft in the forward direction in order to wind the scale belt on the shaft, and proceeds to step B14. In step B14, the charging power supply 76 is turned on, and it proceeds to step B15. In step B15, the shutter solenoid is turned off before proceeding to step B16. In step B16, the paper is sent by the resist rollers to the image transfer section, decreases the displayed content of the print number display section on the control panel and increases the count of the counter, that is not shown, in the selected developing apparatus, each by one, and outputs a pulse for print number counting. The print number counter consists of an OR circuit formed by a counter for the first developing apparatus 28a and a counter for the second developing apparatus 28b, and the output of the OR circuit is given to the page searcher 4 which counts the print number based on the output of the OR circuit received. In the ensuing step B17, whether or not the second developing apparatus is selected is checked, and it proceeds to step B18 if the second developing apparatus is not selected. In step B18, the charging power supply is isolated, and proceeds to step B21. On the other hand, if the second developing apparatus is selected in step B17, it proceeds to step B19. In step B19, it proceeds to step B20 by turning on the remote signal of the transfer power supply with the timing in which the tip of the paper arrives at the image transfer section after rotating the resist rollers in step B16. In step B20, the scanning light is screened not to reach the photosensitive drum 21 by turning on the shutter solenoid, and it proceeds to step B21. In step B21, rotation of the rotation shaft is brought to a stop to complete the scanning of the film, and then proceeds to step B21a. In step B21a, whether or not the page searcher is installed is checked, and it proceeds to step B21b if the page searcher 4 is installed (affirmation of step B21) and it proceeds to step B22 if it is not installed (negation of step B21a). In step B21b, whether or not a print request signal is output from the page searcher is judged. If a print request signal is output (affirmation of step B21b), it proceeds to step B22, compares the number of prints that was set in step A33j (namely, 9 pages of prints) and the number of pages actually printed, and whether or not printing was completed is judged. If printing was completed (affirmation of step B22) or a print request signal was not output (negation of step B21b), it proceeds to step B23, and flag A is set to 1 in order to go back to the screen projection mode. In addition, if printing is not completed yet, it proceeds to step B24, and if printing was completed, it proceeds to step B23. In step B23, flag A is set to 1 to carry out film projection once more, and proceeds to step B24. In step B24, the transfer shaft is rotated in reverse direction to start the operation of returning the turning mirror 14 to the starting position of scanning, and proceeds to step B25. In step B25, the resist rollers 37 are brought to stop and it proceeds to step B26. In step B26, the remote signal D of the transfer power supply 77 is turned off with the timing in which the rear end of the paper passes by the image transfer section, and proceeds to step B27. In step B27, whether or not the turning mirror 14 is in the scan start position is checked and it proceeds to step B28 if it is in the scan start position. In step B28, the rotation shaft is brought to a stop, and it proceeds to step B28a. In step B28a, whether or not the page searcher 4 is installed is checked, and it proceeds to step B28b if it is installed (affirmation of step B28a) and it proceeds to step B29 if it is not installed (negation of step B28b). In step B28b, whether or not a print request signal is output from the page searcher 4 is judged, and it proceeds to step B29 if a print request signal is output to carry out once more the comparison which was given in step B22. If a print request signal is not output (negation of step B28b), it proceeds to step B30. In step B29, whether or not the number of prints set by the reader-printer in step B29 was completed is checked, and it returns to step B22 if it is not completed yet, to repeat the operation described before. In step B30, whether or not the developer concentration of the selected developing apparatus is above a minimum concentration level is checked using a signal from the developer concentration detector of the selected developing apparatus, and it proceeds to step B32 if it is above the set minimum concentration level, and it proceeds to step B31 if it is not above the minimum concentration level. In step B31, whether or not the developer was refilled continuously for a predetermined length of time is checked, and it goes back to step B30 to repeat the above operation if it was not. When the developer was refilled continuously for the predetermined length of time, it proceeds to step B32. In step B32, the pole position switching solenoid is turned off, and it proceeds to step B33. In step B33, the charging power supply is turned off before proceeding to step B34. In step B34, if the second developing apparatus is selected, it proceeds to step B35. In step B35, the development bias power supply is turned off with the timing in which the point, where charging of the photosensitive drum 21 in step 33 was completed, arrives at the developing region of the second developing apparatus, and it proceeds to step B35a. On the other hand, if the second developing apparatus 28b is not selected in step B34, then it proceeds to step B35a by skipping step B35. In step B35a, completion of check of the rear end of the paper is confirmed, and then it proceeds to step B35b. In step B35b, P-RUN is turned off, and the completion of printing and the return of the reader-printer body to the standby condition are indicated to the page searcher 4. In the ensuing step B36, the development bias power supply, transfer power supply, and detachment power supply are respectively turned off before it proceeds to step B37. In step B37, by turning off the main motor, reversible motor, and discharging lamp, it proceeds to step B38. In step B38, the blade solenoid of the cleaner 32 is turned off, and it proceeds to step B39a. In step B39a, whether or not the page searcher 4 is installed is judged, and it proceeds to step B39b if it is installed (affirmation of step B39a), and it returns to the standby condition if it is not installed (negation of step B39a). In step B39b, whether or not a print request signal is output from the page searcher 4 is judged, and it returns to step B1 if a print request is output, namely, if printing of the number of pages that was input to the page searcher 4 is not completed yet, to repeat the similar steps once again from the beginning. If a print request was not output (negation of step 39b), it returns to the standby state.

Figure 12A:
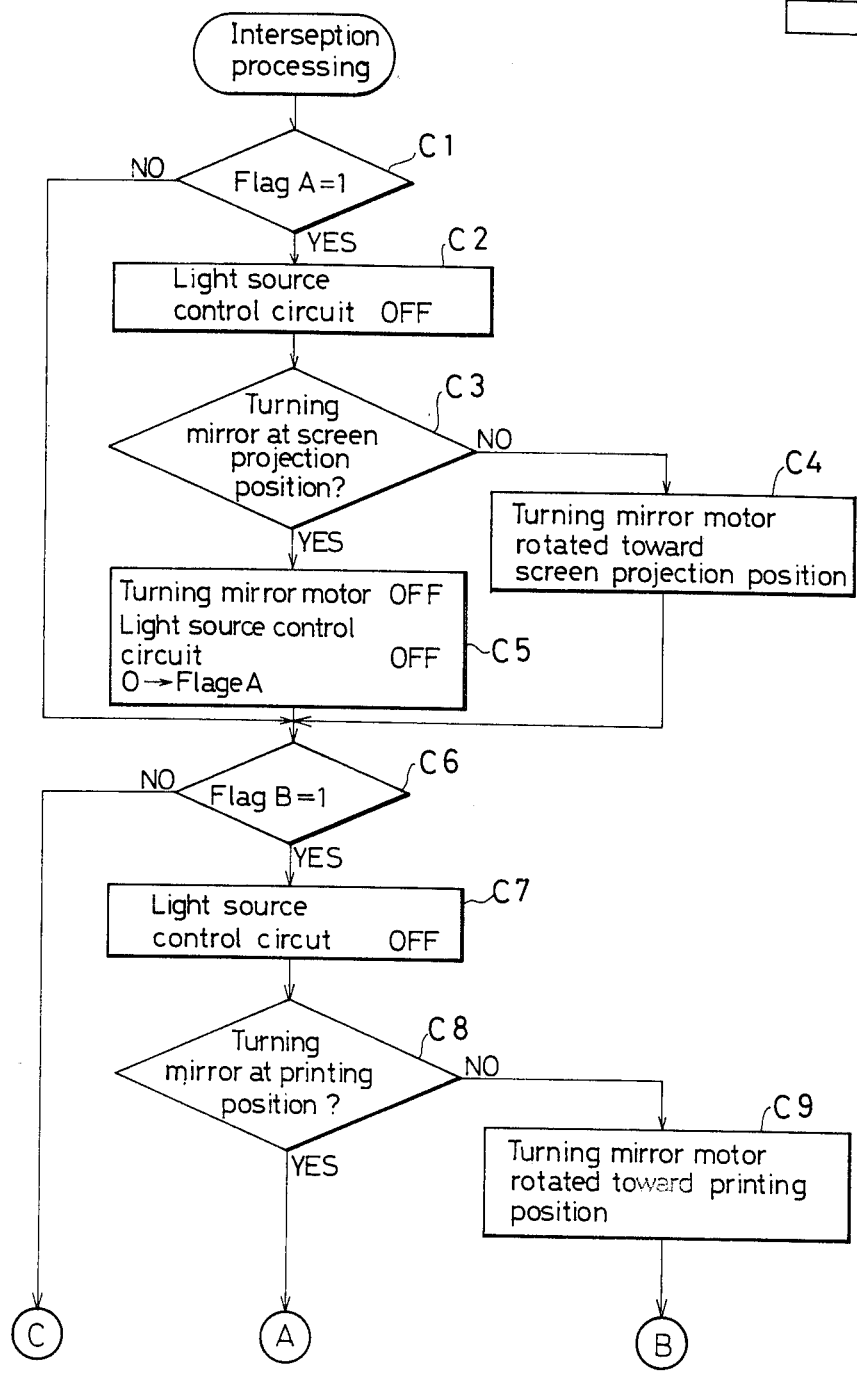
FIG. 12 is a flow chart which shows the interruption operation as detailed in FIG. 12(A) to FIG. 12(C).

Next, interruption processing will be described by referring to FIG. 12 (A), FIG. 12 (B), and FIG. 12 (C).

The interruption processing is arranged to be carried out with an interval of a predetermined length of time. When the interruption processing is started, it proceeds to step C1. In step C1, whether or not flag A is set to 1 is checked, and it proceeds to step C2 if it is not set to 1. In step C2, the remote signals H and J of the light source control circuit is turned off to put out the light source 10, and it proceeds to step C3. In step C3, whether or not the turning mirror is in the screen projection position, that is, whether or not the turning mirror 14 is in a position which does not obstruct the incidence of the film projection light on the mirror 15, is checked by means of a position detection switch, and it proceeds to step C4 if the turning mirror 14 is not in the screen projection position. In step C4, the turning mirror motor is rotated so as to move the rotating mirror 14 in the screen projection direction, and it proceeds to step C6. On the other hand, if the turning mirror is in the screen projection position, it proceeds to step C5. In step C5, the turning mirror motor is turned off, the light source 10 is lighted in the screen mode by turning on the remote signal H of the light source control circuit 83, and set flag A to 0, before proceeding to step C6. In step C5, whether or not flag B is set to 1 is checked, and it proceeds to step C14 if it is not set to 1, and it proceeds to step C7 if it is set to 1. In step C7, the light source 10 is put out by turning off the remote signals H and J of the light source control circuit 83, and proceeds to step C8. In step C8, whether or not the turning mirror is in the printing position, namely, whether or not the turning mirror is situated above the lens holder section 13, is checked with a position detection switch, of the rotating mirror 14, which is not shown, and it proceeds to step C9 if the turning mirror 14 is not in the printing position. In step C9, the turning mirror 14 is turned to be moved in the direction of printing position, and proceeds to step C14. On the other hand, if the turning mirror 14 is in the printing position in step C8, the turning mirror motor is turned off before proceeding to step C11. In step C11, whether or not the second developing apparatus is selected is checked, and it proceeds to step C12 if the second developing apparatus is selected and it proceeds to step C13 by skipping step C12 if the second developing apparatus is not selected. In step C12, the remote signal J of the light source control circuit 83 is turned on and the shutter solenoid 16 is turned on to screen the scanning light path on the photosensitive drum 21, and proceeds to step C13. In step C13, the remote signal H of the light sourced control circuit 83 is turned on to light up the light source in the P - P or N - P mode, and further, set 0 to flag B before proceeding to step C14. In step C14, whether or not it is in the standby state is checked, and it proceeds to step C15 if it is in the standby state. In step C15, whether or not the standby key on the control panel 2 is depressed is checked, and it proceeds to step C16 if it is in on-state. In step C16, whether or not the light source 5 is lighted up is checked, and if it is lighted, in step C17, the light source 10 is put out by turning off the remote signals H and J of the light source control circuit. In the ensuing step C17a, S-INIT is turned off, and by turning off S-INIT the fact that the reader-printer body entered the energy-saving mode is indicated at the same time to the page searcher 4. Then, by turning off all the displays on the control panel 2, the interruption processing is completed. Further, if the light source is not lighted up, in step C16, it proceeds to step C16a, turns on S-INIT, and indicates to the page searcher 4 that the energy-saving mode is released by turning on S-INIT, and proceeds to step C18. In step C18, whether or not the N - P development is given priority is checked, and if the N - P development is given a priority, it proceeds to step C19 where the second developing apparatus is selected, and if priority is not given to the N - P development, the first developing apparatus is selected in step C20, in each case it proceeds to step C21. In step C21, the remote signal H of the light source control circuit 83 is turned on to light up the light source 10 in the screen mode. In the next step C22, whether or not the page searcher 4 is installed is judged, and it proceeds to step C23 if the page searcher 4 is installed (affirmation of step C22) and it proceeds to C24 if it is not installed (negation of step C22). In step C23, the display of print number is put out to indicate to the operator that the major operational functions are transferred to the page searcher 4. Further, in step C24, the prior number display remains as lighted, indicating that the major operational functions are retained by the reader-printer body. This completes the interruption processing.

Figure 13:
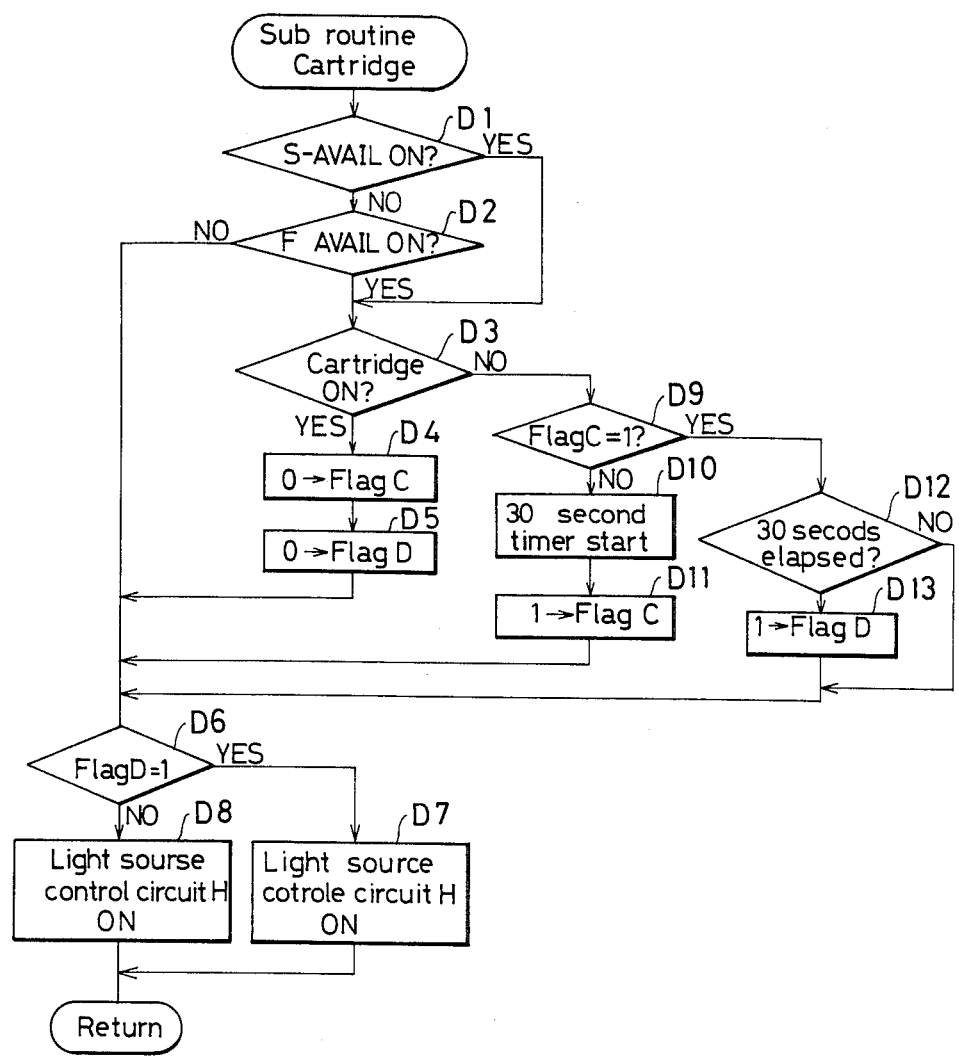
FIG. 13 is a flow chart which shows the subroutine in the processing flow charts in FIG. 10 and FIG. 11.

FIG. 13 shows the subroutine in the processing flow charts shown in FIG. 10 and FIG. 11. Among the subroutine, when either S-AVAIL which shows that the page searcher 4 is installed or F-AVAIL which shows that the film handler 3 is installed, is turned on (affirmation of step D1 or affirmation of step D2), if the cartridge film 5 is mounted (affirmation of step D3), then flag C is set to 0 (step D4) and flag D is set to 1 (step D5). In the following step D6, whether or not flag D is 1 is judged. When flag D is 1, the light source control circuit is turned off (step D7) and when flag D is 0, the light source control circuit is turned on (step D8), so that when the cartridge film 5 is mounted, the light source control circuit is in on-state all the time.

On the other hand, in step D3, when it is decided that the cartridge film 5 is not mounted (negation of step D3), whether or not flag C is set to 1 is judged (step D9). When flag C is judged set to 0 (negation of step D9), a 30-second timer is set (step D10), and at the same time, 1 is set to flag C (step D11). When 1 is set to flag C (affirmation of step D9), at the time when a time-up output of the 30-second timer is generated (affirmation of step D12), 1 is set to flag D. Because of this, flag D is judged to be 1 in the following step D6 (affirmation of step D6), and the light source control circuit is turned off (step D7).

As described in the foregoing, a microfilm reader-printer embodying the present invention can change automatically the control for transferring various kinds of signals between a peripheral device electrically connected to the reader-printer, in response to the order of priority of each peripheral device. Therefore, the reader-printer has such an advantage as maloperations due to misjudgment or carelessness on the prt of the operator can be eliminated completely.

What is claimed is:
1. A microfilm reader/printer, comprising:
a light source device for irradiating with light a microfilm to obtain projection light of the microfilm;
image projection means for displaying an enlarged image of an image information recorded in the microfilm in accordance with the projection light;
means for forming the image information recorded in the microfilm on a recording medium;
a page searcher detachably provided to the microfilm reader/printer for moving the microfilm irradiated with the light; and
means for directing said light source device, image protection means, image forming means, and page searcher so that when said page searcher is first attached to said microfilm reader/printer, the microfilm is automatically moved before said image forming means can form an image on the recording medium.

2. A microfilm reader/printer, comprising:
a light source device for irradiating with light a band-like microfilm to obtain projection light of the microfilm;
image projection means for displaying an enlarged image of an image information recorded in the microfilm in accordance with the projection light;
means for forming the image information recorded in the microfilm on a recording medium;

a page searcher detachably provided to the microfilm reader/printer for feeding and rewinding the bandlike microfilm irradiated with the light; and means for directing said light source device, image projection means, image forming means, and page searcher so that when said page searcher is attached to the microfilm reader/printer, the bandlike microfilm is automatically fed and rewound before said image forming means can form an image on the recording medium.

3. A microfilm reader/printer as in claim 1, wherein said page searcher further comprises print means for selectively activating said image forming means when the microfilm is not being moved, said print means prohibitting said image forming means from forming an image when said microfilm is moving.

4. A microfilm reader/printer as in claim 2, wherein said page searcher further comprises print means for selectively activating said image forming means when the bandlike microfilm is not being fed or rewound, said print means prohibiting said image forming means from forming an image when said microfilm is being fed or rewound.

5. A microfilm reader/printer as in claim 3, wherein said microfilm reader/printer further comprises second print means, not on said page searcher, for selectively activating said image forming means; and said page searcher further comprises means for prohibiting said second print means from activating said image forming means when said page searcher is attached to said microfilm reader/printer.

6. A microfilm reader/printer as in claim 4, wherein said microfilm reader/printer further comprises second print means, not on said page searcher, for selectively activating said image forming means; and said page searcher further comprises means for prohibiting said second print means from activating said image forming means when said page searcher is attached to said microfilm reader/printer.

7. A microfilm reader/printer as in claim 5, wherein said microfilm reader/printer further comprises means for detecting whether said page searcher is attached to the microfilm reader/printer, and said directing means directs said light source device, image projecting means, image forming means, and page searcher in accordance with a detecting signal from said detecting means.

8. A microfilm reader/printer as in claim 6, wherein said microfilm reader/printer further comprises means for detecting whether said page searcher ss attached to the microfilm reader/printer, and said directing means directs said light source device, image projection means, image forming means, and page searcher in accordance with a detecting signal from said detecting means.

9. A microfilm reader/printer comprising:

a light source device for irradiating with light a microfilm to obtain projection light of the microfilm;

image projection means displaying an enlarged image of an image information recorded in the microfilm in accordance with the projection light;

means for forming the image information recorded in the microfilm on a recording medium;

first print means for selectively activating said image forming means;

a film handler for moving a microfilm by frame; and a page searcher detachably provided to the reader/printer including:

means for directing said film handler to execute a frame search when said page searcher is attached to the microfilm reader/printer;

means for prohibiting said first print means from activating said image forming means when said page searcher is attached to the microfilm reader/printer; and second print means for selectively activating said image forming means when said frame search directing means is not operating when said page searcher is attached to the microfilm reader/printer.

* * * * *